(12) United States Patent
Imafuku

(10) Patent No.: US 11,468,504 B2
(45) Date of Patent: Oct. 11, 2022

(54) INFORMATION PROCESSING DEVICE

(71) Applicant: Yosuke Imafuku, Tokyo (JP)

(72) Inventor: Yosuke Imafuku, Tokyo (JP)

( * ) Notice: Subject to any disclaimer, the term of this patent is extended or adjusted under 35 U.S.C. 154(b) by 0 days.

(21) Appl. No.: 17/277,162

(22) PCT Filed: Sep. 18, 2019

(86) PCT No.: PCT/JP2019/036542
§ 371 (c)(1),
(2) Date: Apr. 22, 2021

(87) PCT Pub. No.: WO2020/059747
PCT Pub. Date: Mar. 26, 2020

(65) Prior Publication Data
US 2021/0312539 A1 Oct. 7, 2021

(30) Foreign Application Priority Data
Sep. 18, 2018 (JP) .............................. JP2018-173455

(51) Int. Cl.
*G06Q 30/06* (2012.01)
*G06Q 20/40* (2012.01)
*G06Q 20/42* (2012.01)

(52) U.S. Cl.
CPC ....... *G06Q 30/0645* (2013.01); *G06Q 20/403* (2013.01); *G06Q 20/42* (2013.01); *G06Q 30/0609* (2013.01); *G06Q 30/0641* (2013.01)

(58) Field of Classification Search
CPC ............. G06Q 30/0645; G06Q 20/403; G06Q 30/0609; G06Q 30/0641; G06Q 20/42
See application file for complete search history.

(56) References Cited

U.S. PATENT DOCUMENTS

2012/0253893 A1* 10/2012 Anbalagan ......... G06Q 30/0601
705/14.1
2012/0254303 A1* 10/2012 Anbalagan ......... G06Q 30/0645
709/204
(Continued)

FOREIGN PATENT DOCUMENTS

CN 101443804 A 5/2009
CN 107256598 A 10/2017
(Continued)

OTHER PUBLICATIONS

Notice of Reasons for Rejection issued in corresponding JP Application No. 2020-518737, dated Aug. 4, 2020.
(Continued)

*Primary Examiner* — Fahd A Obeid
*Assistant Examiner* — Michael Jared Walker
(74) *Attorney, Agent, or Firm* — Osha Bergman Watanabe & Burton LLP

(57) ABSTRACT

The purpose of the present invention is to provide a C to C rental platform through which one or more individuals who want to lend objects can be efficiently matched with one or more individuals who desire to borrow the objects. In a management server 1 which supports lender users UL1 to ULn who desire to lend an object and borrower users UB1 to UBm who desire to borrow the object, an exhibit acquisition unit 10 acquires exhibit information provided from each of the lender users UL1 to ULn. An exhibit presentation unit 102 presents one or more pieces of the acquired exhibit information to the borrower users UB1 to UBm. A borrow receiving unit 103 receives, from the borrower user UB, an application of wanting to borrow the object as a borrow application. A borrowing presentation unit 104 presents, to the lender user UL, that there has been the borrowing application. Accordingly, the problem is addressed.

8 Claims, 19 Drawing Sheets

(56) References Cited

U.S. PATENT DOCUMENTS

| | | | | |
|---|---|---|---|---|
| 2012/0254304 | A1* | 10/2012 | Anbalagan | G06Q 30/06 709/204 |
| 2012/0265633 | A1* | 10/2012 | Wohlstadter | G06Q 50/16 705/26.3 |
| 2015/0170261 | A1* | 6/2015 | Stremsdoerfer | G06Q 40/02 705/307 |
| 2015/0186988 | A1 | 7/2015 | Skinner et al. | |
| 2017/0083959 | A1* | 3/2017 | Bousis | G06Q 30/0643 |
| 2018/0018606 | A1* | 1/2018 | Love | G06Q 10/02 |
| 2018/0078843 | A1* | 3/2018 | Tran | A61B 5/0024 |
| 2019/0197624 | A1* | 6/2019 | Jo | G06Q 30/0645 |

FOREIGN PATENT DOCUMENTS

| | | | | |
|---|---|---|---|---|
| CN | 107452146 | A | | 12/2017 |
| CN | 108734522 | A | | 11/2018 |
| JP | 2002-149797 | A | | 5/2002 |
| JP | 2007-280245 | A | | 10/2007 |
| JP | 2008-197959 | A | | 8/2008 |
| JP | 2011-159195 | A | | 8/2011 |
| JP | 2011159195 | A | * | 8/2011 |
| JP | 2013-092920 | A | | 5/2013 |
| JP | 2015-129983 | A | | 7/2015 |
| JP | 2017-097850 | A | | 6/2017 |
| WO | 2007117513 | A2 | | 10/2007 |

OTHER PUBLICATIONS

"Mercari" homepage, Jan. 20, 2021 Internet URL: https://www.mercari.com/jp/ (10 pages).

"Yahoo Auction" homepage, Jan. 20, 2021 Internet URL: https://auctions.yahoo.co.jp/ (4 pages).

"Stay Japan" homepage, Jan. 20, 2021 Internet URL: https://stayjapan.com/ (6 pages).

Decision to Grant a Patent issued in Japanese Application No. 2020-518737, dated Oct. 13, 2020 (5 pages).

* cited by examiner

FIG. 9

| | | | | |
|---|---|---|---|---|
| OFFEROR INFORMATION (H31) | REFERENCE CURRENT PRICE: 100,000 YEN | | | CHECK AUCTION PRICE (B331) |
| OFFER TARO (145) ☺100 😐40 ☹5 OFFER REGION: HOKKAIDO | RECENT MONTHLY RATE OF RETURN: 15%(15,000 YEN/MONTH) | | | |

H33

APPROACH REGARDING OWNERSHIP CHANGE (H32, B321)

LENDING LOG (H34)

| PERIOD | MONTHLY FEE CONVERSION | USER | REVIEW |
|---|---|---|---|
| 2018.02.22～2018.03.22 | 15,000 YEN | hogehoge | ☹ |
| 2018.01.22～2018.01.31 | 17,000 YEN | fugafuga | 😐 |
| 2018.01.10～2018.01.12 | 19,000 YEN | sakata | ☺ |
| 2017.12.22～2017.12.31 | 22,000 YEN | yoshida | ☺ |
| 2017.10.13～2017.10.19 | 25,000 YEN | iguchi | ☺ |

REFERENCE DEPRECIATION TABLE (H35)

¥15,000/MONTH
OUTRIGHT PURCHASE ¥45,000

(Graph: GUIDE RENTAL FEE vs TIME, with lines L1 and L2; x-axis: ONE YEAR, TWO YEARS, THREE YEARS, FOUR YEARS; y-axis: 100, 200, 300, 400, 500)

MESSAGE (H36)

JUNE 2, 2019
DEAR ○○○***

I'D LIKE TO BORROW THE ITEM. BUT, WOULD YOU PLEASE GIVE ME A DISCOUNT?
I CAN DECIDE IMMEDIATELY IF GIVEN A DISCOUNT OF 3000 YEN!

JUNE 2, 2019
DEAR ○○○***

I'LL GIVE YOU A DISCOUNT OF 2000 YEN.
I'M LOOKING FORWARD TO YOUR REPLY.

FIG. 16

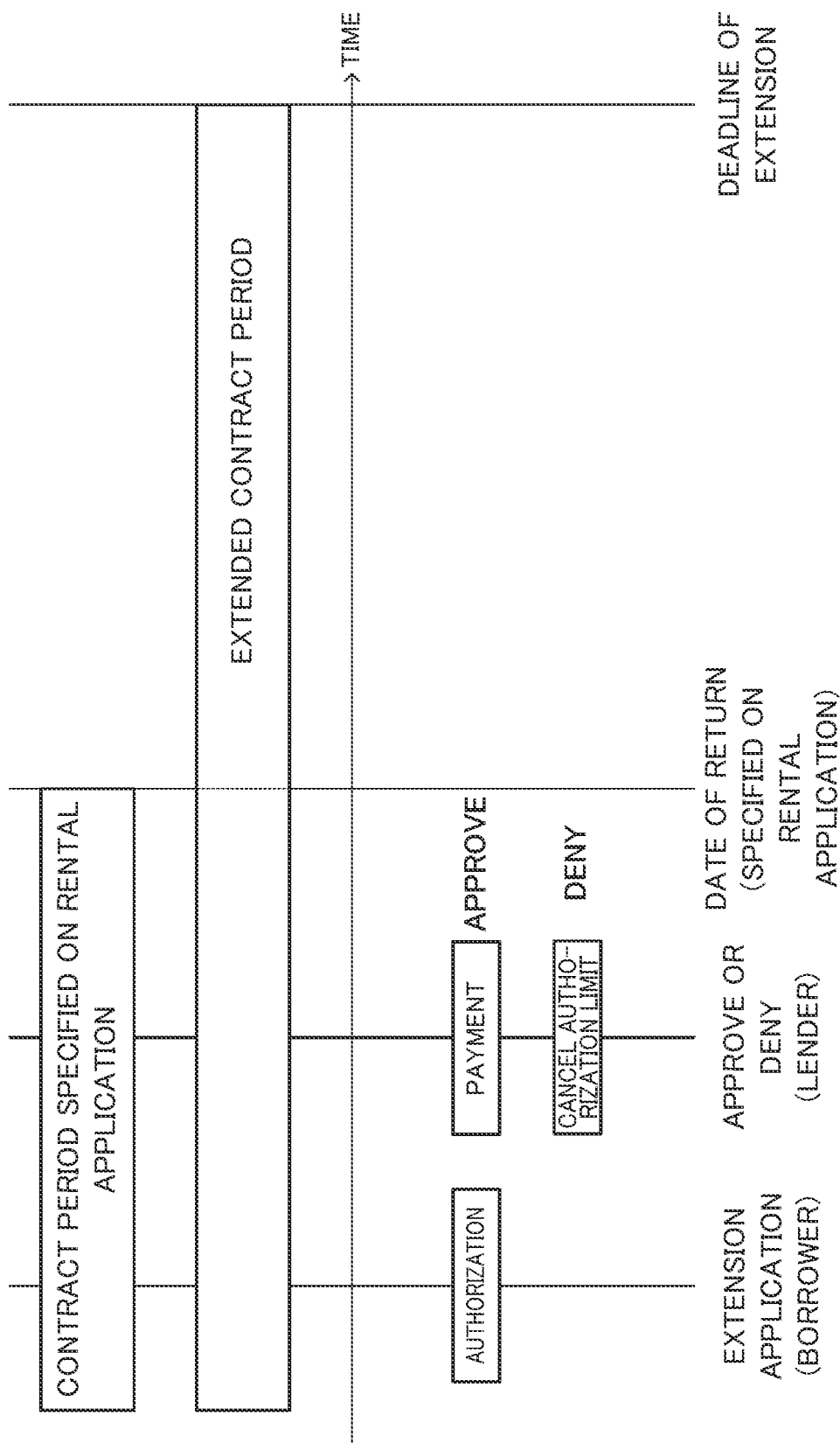

FIG. 18

EXTENSION APPLICATION

NOTE THAT EXTENSION APPLICATION NEEDS TO BE APPROVED BY LENDER. EXTENSION BECOMES VALID WHEN LENDER APPROVES EXTENSION APPLICATION.PAYMENT BECOMES IMMEDIATELY INVALID WHEN EXTENSION IS DENIED.PLEASE EXTEND AT LEAST FOUR DAYS BEFORE DATE OF RETURN.

DATE OF RETURN OF THIS ITEM : JANUARY 30, 2019

[REQUIRED] END DATE OF EXTENDED RENTAL PERIOD | END DATE OF RENTAL PERIOD

DESIRED EXTENSION DATE : BY JUNE 21, 2019

———————— (RENTAL OF 20 DAYS) ————————

| | | |
|---|---|---|
| 3 MONTHS | @100,000 YEN | 1,300,000 YEN |
| +2 WEEKS | @50,000 YEN | 200,000 YEN |
| +29 DAYS | @1,500 YEN | 50,000 YEN |
| 3 MONTHS | 8% | 1,000 YEN |

TOTAL 300,000 YEN

PAYMENT METHOD

CREDIT CARD [ : ] LAST FOUR DIGITS XXXX CHANGE

⊘ EXTENSION APPLICATION & PAYMENT

FIG. 19

PROCESSING EXTENSION APPLICATION

PLEASE USE MESSAGE FOR NEGOTIATION.

| DESIRED EXTENSION DATE | : BY JUNE 21, 2019 |
|---|---|
| ——— (RENTAL OF 20 DAYS) ——— | |
| 3 MONTHS  @100,000 YEN | 1,300,000 YEN |
| +2 WEEKS  @50,000 YEN | 200,000 YEN |
| +29 DAYS  @1,500 YEN | 50,000 YEN |
| 3 MONTHS  8% | 1,000 YEN |
| | TOTAL  300,000 YEN |

[REQUIRED] WHETHER YOU APPROVE OR DENY EXTENSION

EXTENDABLE. ▼

PLEASE SELECT "EXTENDABLE, BUT DESIRED EXTENSION DATE NEEDS TO BE CHANGED." ONLY WHEN YOU HAVE MADE NEGOTIATION AND AGREED WITH BORROWER FOR DESIRED EXTENSION DATE TO BE CHANGED.

⊘ PROCESS EXTENSION APPLICATION

INFORMATION PROCESSING DEVICE

TECHNICAL FIELD

The present invention relates to an information processing device.

BACKGROUND ART

In the past periods, people normally buy and possess new homes, new home electrical appliances, new cars, and everything they need as their assets. Under such a widely prevailing sense of value, which is often used as a so-called barometer, accumulation of such assets has been thought to reflect the degree of an individual's happiness. However, under the idea known as Business-to-Consumer (B to C), where enterprises carry out their businesses to target ordinary consumers, used-product markets and rental markets have been created to handle various products. This indicates that there are increased numbers of people having different senses of values from the sense of value described above. Some say that the reduction in homeownership and the polarization of annual income between the upper income class and the lower income class, for example, are such phenomena derived along with such changes in the sense of value. For this reason, in modern society, a method of matching consumers and suppliers by making good use of the assets owned by individuals has come to be widely used. This indicates that there is a greater number of people who are thinking about efficiently acquiring what they want when they want it, and, when an item is no longer needed, rather than simply throwing it away, allowing somebody who needs the item to use the item. Personal trading such as flea markets, auctions, vacation rentals (or min-paku known in Japan) are all examples of Consumer-to-Consumer (C to C) trading reflecting the idea described above. Under such situations, those that have been already provided include a system that causes pieces of various types of information to match with each other (see Patent Document 1) and various services for carrying out C to C trading (see Non-Patent Documents 1 to 3).

Patent Document 1: Japanese Unexamined Patent Application, Publication No. 2015-129983

Non-Patent Document 1: Mercari (https://www.mercari.com/jp/)

Non-Patent Document 2: Yahoo Auctions! (https://auctions.yahoo.co.jp/)

Non-Patent Document 3: STAY JAPAN (https://stayjapan.com/)

DISCLOSURE OF THE INVENTION

Problems to be Solved by the Invention

However, conventional technologies including the technologies described in Patent Document 1 and Non-Patent Documents 1 to 3 do not include renting of items as a subject of C to C electronic commerce trading. That is, it is not possible to efficiently match one or more individuals who desire to lend an item with one or more individuals who desire to borrow the item.

In view of the situations described above, an object of the present invention is to provide a C to C rental platform through which one or more individuals who desire to lend an item are able to be efficiently matched with one or more individuals who desire to borrow the item. Means for Solving the Problems To achieve the item described above, an information processing device according to an aspect of the present invention is an information processing device that supports one or more first users who desire to lend items and one or more second users who desire to borrow the items. The information processing device includes:

offer acquisition section of acquiring, as offer information, information regarding the items, the information being provided from each of the one or more first users; offer presentation section of presenting, to the one or more second users, one or more pieces of the offer information acquired by the offer acquisition section;

borrow receiving section of receiving, in a case in which there is an application from one of the one or more second users of wanting to borrow one of the items, the application as a borrow application; and borrow presentation section of presenting, to a corresponding one of the one or more first users, that there is the borrow application.

Effects of the Invention

According to the present invention, it is possible to provide a C to C rental platform through which one or more individuals who desire to lend items are able to be efficiently matched with one or more individuals who desire to borrow the items.

BRIEF DESCRIPTION OF THE DRAWINGS

FIG. 9 is a view illustrating a specific example of a screen displayed on each of the lender terminals and the borrower terminals, in a case in which a button displayed in FIG. 8 has been pressed;

FIG. 16 is a conceptual view illustrating a flow of processing in a case in which the borrower user who has been renting an item makes an extension application for a rental period;

FIG. 17 is a view illustrating a specific example of an operational screen displayed on each of the borrower terminals, in a case in which the borrower user makes an extension application for a rental period;

FIG. 18 is a view illustrating a specific example of an operational screen displayed on each of the lender terminals, in a case in which the lender user who has been lending an item performs an operation of responding to the extension application for the rental period; and FIG. 19 is a view illustrating a specific example of a method of capturing an image of an offered item.

PREFERRED MODE FOR CARRYING OUT THE INVENTION

An embodiment of the present invention will now be described herein with reference to the accompanying drawings.
[System Configuration]

Figure 1:
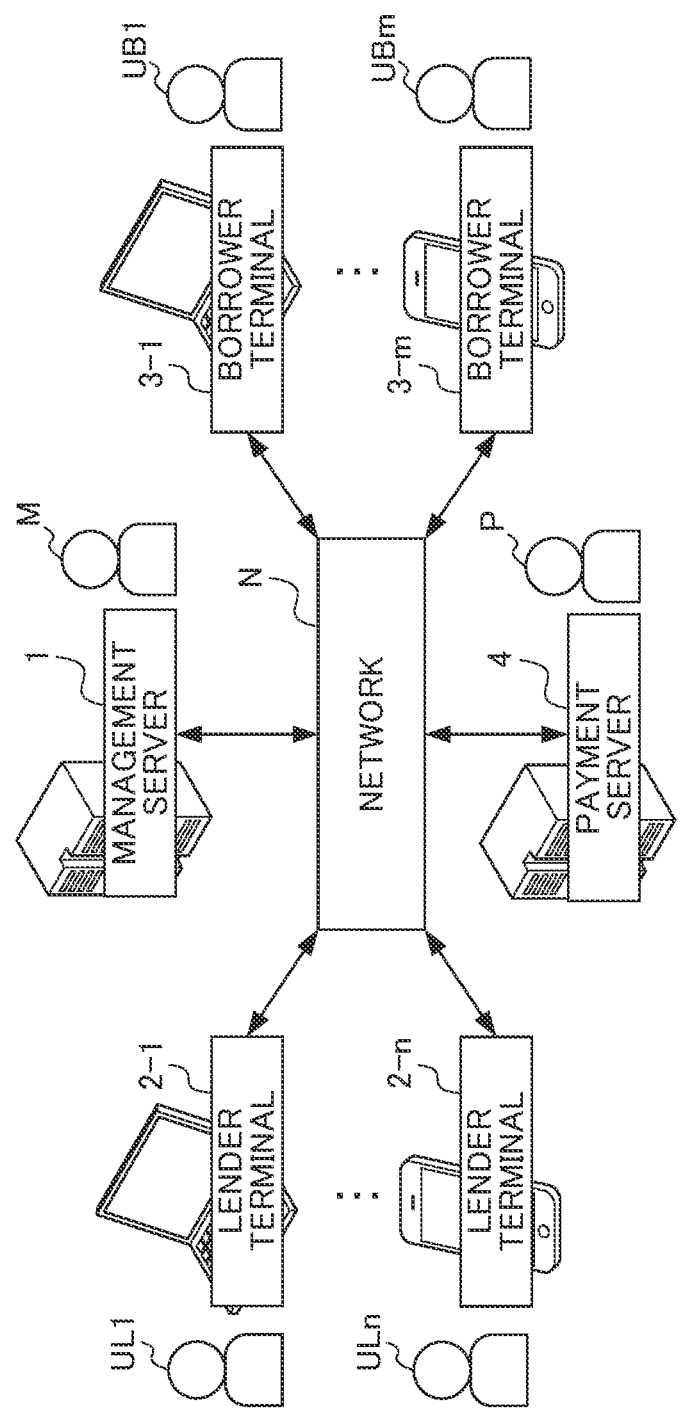
FIG. 1 is a view illustrating an outline configuration of an information processing system including a management server according to an embodiment of an information processing device of the present invention.

FIG. 1 is a view illustrating an outline configuration of an information processing system including a management server 1 according to an embodiment of an information processing device of the present invention.

The information processing system illustrated in FIG. 1 includes the management server 1, lender terminals 2-1 to 2-$n$ (n is a desired integer value equal to or more than 1), borrower terminals 3-1 to 3-$m$ (m is a desired integer value equal to or more than 1), and a payment server 4, all of which are coupled to each other via a predetermined network N such as the Internet. The management server 1 is an information processing device managed by a service provider M providing a C to C rental service (hereinafter referred to as "the present service"). The management server 1 executes various types of processing to manage operations of the lender terminals 2-1 to 2-$n$ and the borrower terminals 3-1 to 3-$m$. The lender terminals 2-1 to 2-$n$ are information processing devices, such as personal computers, smart phones, and tablet computers, respectively operated by users (hereinafter referred to as "lender users") UL1 to ULn who desire to lend items. The borrower terminals 3-1 to 3-$m$ are information processing devices, such as personal computers, smart phones, and tablet computers, respectively operated by users (hereinafter referred to as "borrower users") UB1 to UBm who desire to borrow items. Note that, unless otherwise specifically distinguished from each other, the lender users UL1 to ULn, the lender terminals 2-1 to 2-$n$, the borrower users UB1 to UBm, and the borrower terminals 3-1 to 3-$m$ will be hereinafter respectively and collectively referred to as "lender users UL", "lender terminals 2", "borrower users UB", and "borrower terminals 3". The payment server 4 is an information processing device managed by a payment service provider P providing payment services, and performs payment processing based on payment information generated by the management server 1.

The lender users UL and the borrower users UB are respectively able to use the lender terminals 2 and the borrower terminals 3 each installed with special application software (hereinafter referred to as a "special App") provided for users of the present service to utilize the present service. Furthermore, the lender users UL and the borrower users UB are respectively also able to utilize the present service via a special website (hereinafter referred to as a "special site") provided for users of the present service, in a case in which the special site is displayed through a browser function of each of the lender terminals 2 and the borrower terminals 3. Note that, unless otherwise specifically noted, the expression "the lender users UL respectively operate the lender terminals 2" will hereinafter means one of those described below. That is, it means that the lender users UL each launch the special App installed in the lender terminals 2 to perform various operations or utilizes the present service via the special site displayed through the browser function of each of the lender terminals 2. Furthermore, the expression "the borrower users UB respectively operate the borrower terminals 3" will hereinafter means one of those described below. That is, it means that the borrower users UB each launch the special App installed in the borrower terminals 3 to perform various operations or utilizes the present service via the special site displayed through the browser function of each of the borrower terminals 3.
[Service Contents]

Figure 2:
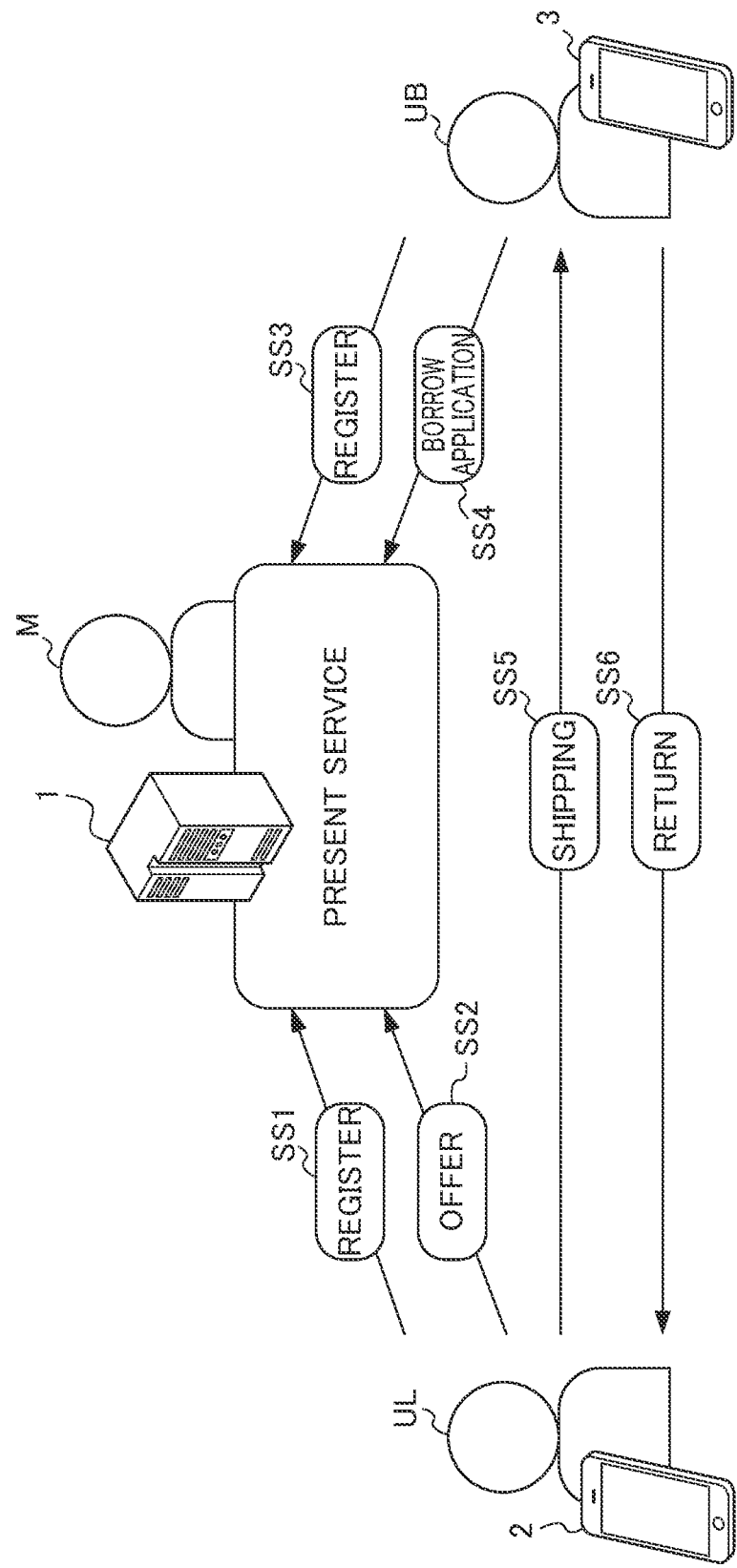
FIG. 2 is a conceptual view illustrating basic flows of the present service.

Next, with reference to FIGS. 2 and 3, flows of the present service, which various types of processing executed by the management server 1 according to the embodiment of the information processing device of the present invention is able to achieve, will now be described herein. FIG. 2 is a conceptual view illustrating basic flows of the present service. Note that FIG. 2, and FIG. 3 described later, both describing one of the lender users UL and one of the borrower users U3, respectively, illustrate simplified cases to describe the flows of the present service in an easily understandable manner. In actual cases, there may be a plurality of the lender users UL and a plurality of the borrower users UB in the present service.

At step SS1, to receive the provision of the present service, the lender user UL operates the lender terminal 2 to carry out user registration for the present service. At step SS2, the lender user UL operates the lender terminal 2 to register, in the present service, information regarding an item that the lender user UL desires to lend (hereinafter referred to as "offer information"). Upon the registration of the offer information, the item is treated as an "offered item" that is "offered" in the present service. The lender user UL who has offered the offered item is then treated as an "offeror". Note herein that contents of offer information to be registered in the present service are not particularly limited. It is possible to register, as offer information, desired information regarding an offered item. Specifically, for example, it is possible that offer information includes text information regarding, as for an offered item, a name, a type, characteristics, a size, a weight, a purchase price, a desired rental fee, a rental period, and whether it is sellable, and includes image information based on a captured image of the offered item. Note that items treated as offered items in the present service are not particularly limited, as long as the items are available for rental. Specifically, for example, clothes, camping gear such as tents, golf clubs, fishing gears, suitcases, gaming devices, tablet computers, personal computers, office automation (OA) equipment, wristwatches, land, spaces, houses, furniture articles, fixtures, fittings, vehicles, motorcycles, books, compact discs (CD), records, cameras, shoes, accessories, bags, special tools, and nursery items such as baby carriages may all be listed for rental.

At step SS3, to receive the provision of the present service, the borrower user UB operates the borrower terminal 3 to carry out the user registration for the present service. Note herein that the lender user UL having undergone the user registration at step SS1 and the borrower user UB having undergone the user registration at step SS3 are not differentiated from each other in any particular way, but are both registered as users who receive the provision of the present service. Therefore, the lender user UL is also able to receive services for the borrower users UB, and the borrower user UB is also able to receive services for the lender users UL. That is, upon user registration for the present service, a user is also allowed to participate as a user who lends an item and to participate as a user who borrows an item.

At step SS4, the borrower user UB makes, in a case in which there is an item that the borrower user UB desires to borrow, among offered items offered in the present service, an application for borrowing the offered item (hereinafter referred to as a "borrow application"). Furthermore, the borrower user UB makes an insurance application as required. Note that, in the present service, the borrower user UB who has made a borrow application for an offered item is also referred to as a "borrow applicant". On the borrower terminal 3, one or more offered items are displayed, together with their offer information. In a case in which there is an item that the borrower user UB desires to borrow, among the one or more offered items displayed on the borrower terminal 3, the borrower user UB operates the borrower terminal 3 to make a borrow application for the offered item. Note that a specific example of an operation of making a borrow application will be described later with reference to FIGS. 6 to 8.

In a case in which the borrower user UB is allowed to borrow the offered item as a result of making the borrow application/the borrower user UB who has made the borrow application makes a payment of the desired rental fee indicated in the offer information. Note that a flow of payment will be described later with reference to FIG. 3.

At step SS5, the lender user UL sends the offered item to the borrower user UB who has made the borrow application. When the offered item has been delivered/the borrower user UB compares the actual item of the offered item that has been sent with the captured image of the offered item, which is included in the offer information. If there are no discrepancies, the borrower user UB then starts to utilize the offered item. Specifically, when the offered item has been delivered to the borrower user UB, the borrower user UB having received the offered item visually compares the captured image of the offered item, which is included in the offer information provided by the lender user UL, with the actual item. If there are no discrepancies between the captured image and the actual item as a result of the visual comparison by the borrower user UB, or if the discrepancy is regarded as acceptable, the borrower user UB then operates the borrower terminal 3 to send, to the management server 1, information indicating the start of the rental. Specifically, for example, although not illustrated, pressing an "Approve" button or a "Start rental" button displayed on the borrower terminal 3 sends the information indicating the start of the rental to the management server 1. The management server 1 then receives the information, accepting that the borrower user UB has approved the start of the rental. On the other hand, if there is a discrepancy that is regarded as unacceptable as a result of the comparison of the actual item of the offered item that has been sent with the captured image, the borrow applicant defers (i.e., does not start) the use of the offered item. In this case, for example, the borrow applicant neither presses the "Approve" button nor the "Start rental" button displayed on the borrower terminal 3, but returns the offered item to the sender. Furthermore, for example, under a system environment where a refund after the completion of the payment processing is permitted, the borrow applicant is able to negotiate with the offeror via the present service to receive a refund of a part of the rental fee to start the rental or to receive a refund of all the rental fee to cancel the rental. Such a negotiation as described above may be directly performed between users by utilizing a communication tool provided in the present service or may be indirectly performed via the present service provider M.

At step SS6, the borrower user UB returns the offered item to the offeror of the offered item by an expiration date of the rental period. When the offered item is returned to the lender user UL, the lender user UL compares the actual item of the offered item that has been returned with the captured image of the offered item, which is included in the offer information. If there are no discrepancies, the present service is completed. Note herein that, if there is a discrepancy that, is regarded as unacceptable as a result of the comparison of the actual item of the offered item that has been returned with the captured image, the offeror is able to negotiate with the borrow applicant via the present service to take actions as described below, for example. That is, the offeror is able to charge, to the borrow applicant, an additional fee to the rental fee for which the payment has been completed or to have the borrow applicant buy the offered item. Such a negotiation as described above may be directly performed between users by utilizing the communication tool provided in the present service (FIGS. 8 and 9) or may be indirectly performed via the present service provider M.

Figure 3:
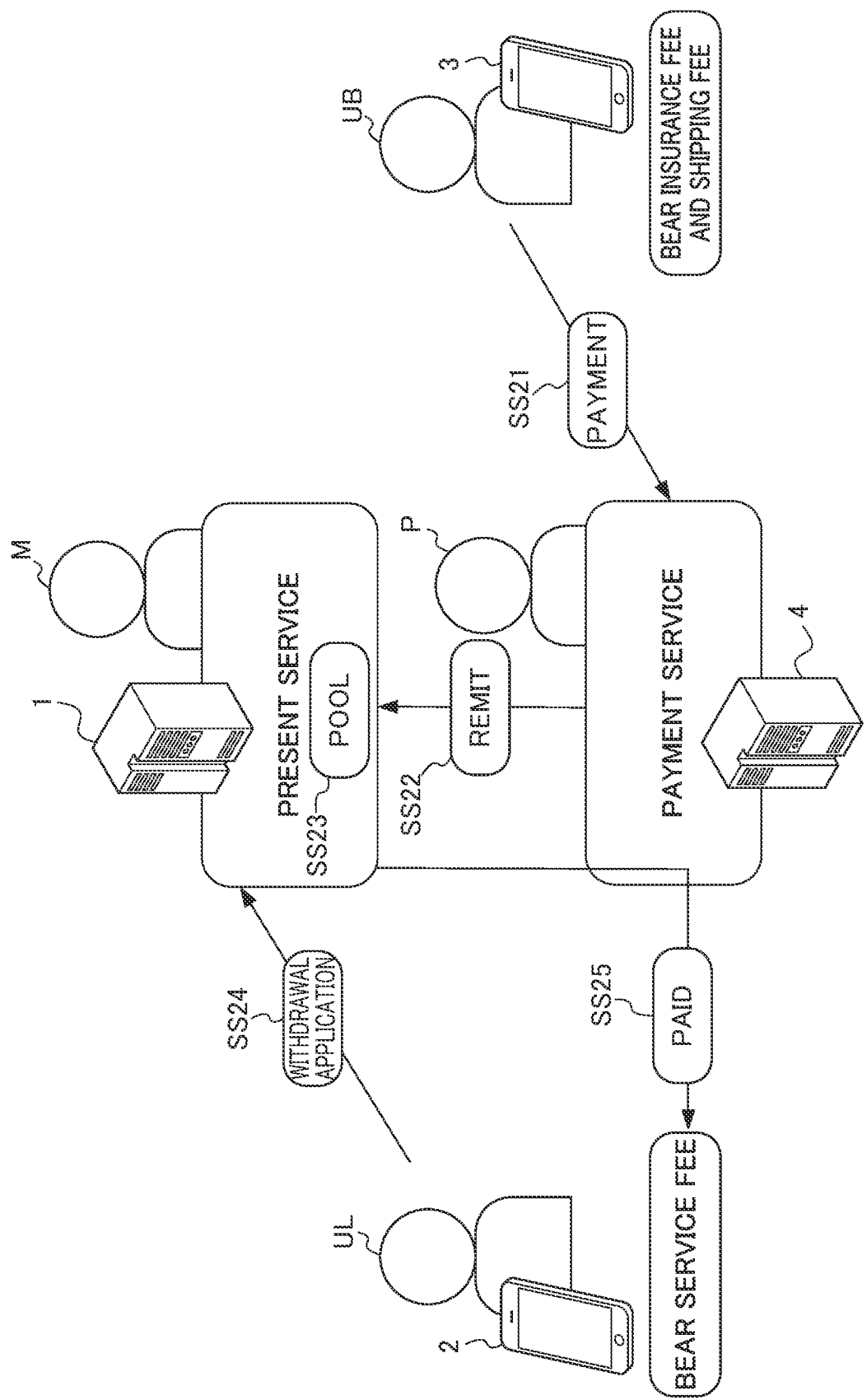
FIG. 3 is a conceptual view illustrating a flow of a fee paid by a borrow applicant in the present service.

FIG. 3 is a conceptual view illustrating a flow of a fee paid by a borrow applicant in the present service.

At step SS21, the borrower user UB plays a role as a borrow applicant to make a payment of the rental fee. Specifically, the borrower user UB operates the borrower terminal 3 to request the payment service provider P to process payment of the rental fee. Furthermore, when the borrower user UB bears an insurance fee and a shipping fee, the borrower user UB requests the payment service provider P to process payment of the rental fee, the insurance fee, and the shipping fee (hereinafter referred to as "rental and other fees").

The payment service provider P who has performed the payment processing of the rental and other fees based on the request from the borrower user OB remits, at step SS22, to the present service provider M, an amount of money acquired by subtracting a predetermined commission fee from the payment amount (hereinafter referred to as a "sales amount"). At step SS23, the present service provider M pools the sales amount that has been remitted.

At step SS24, the lender user UL who is the offeror withdraws cash in an amount that is equal to or less than an amount of money acquired by subtracting the fee of the present service from the sales amount that the present service provider M has pooled. Specifically, the lender user UL who is the offeror operates the lender terminal 2 to make an application to withdraw cash in an amount that is equal to or less than the amount of money acquired by subtracting the fee of the present service from the sales amount (hereinafter referred to as a "withdrawal application").

At step SS25, the present service provider M performs paying-in processing in cash based on a content of the withdrawal application from the lender user UL who is the offeror. Specifically, the present service provider M performs the paying-in processing via the payment service based on the content of the withdrawal application from the lender user UL who is the offeror. Note that money may be directly paid from an account of the present service provider M without performing the paying-in processing via the payment service.

[Hardware configuration]

Figure 4:
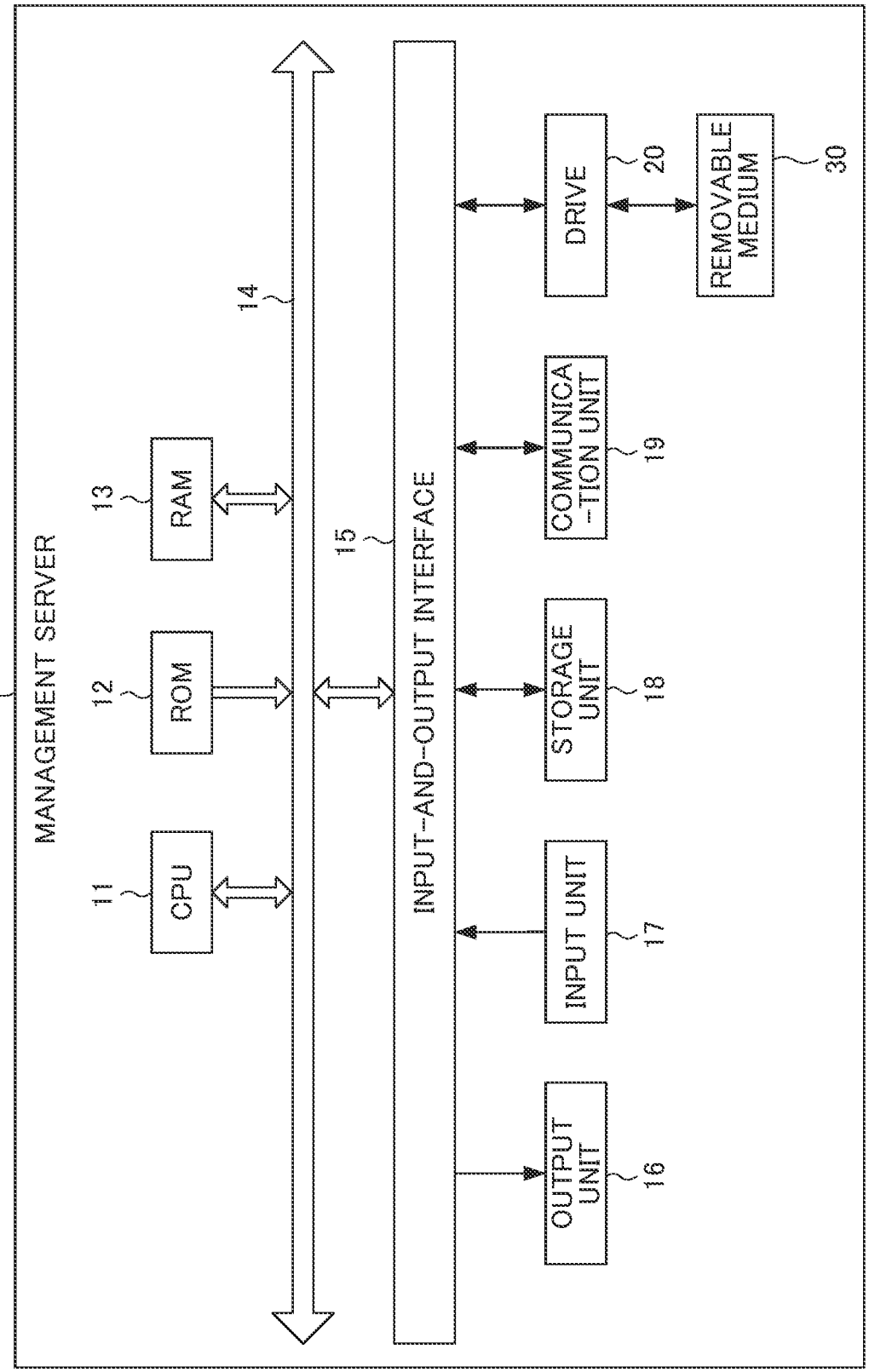
FIG. 4 is a block diagram illustrating a hardware configuration of the management server in FIG. 1.

Next, a hardware configuration of the management server 1 that executes various types of processing to provide the present service will now be described herein. FIG. 4 is a block diagram illustrating the hardware configuration of the management server 1 in FIG. 1.

The management server 1 includes a central processing unit (CPU) 11, a read only memory (ROM) 12, a random access memory (RAM) 13, a bus 14, an input-and-output interface 15, an output unit 16, an input unit 17, a storage unit 18, a communication unit 19, and a drive 20.

The CPU 11 executes various types of processing in accordance with programs recorded in the ROM 12 or programs loaded from the storage unit 13 to the RAM 13. The RAM 13 appropriately stores, for example, data necessary for the CPU 11 to execute various types of processing.

The CPU 11, the ROM 12 and the RAM 13 are coupled to each other via the bus 14. The bus 14 is further coupled to the input-and-output interface 15. The input-and-output interface 15 is coupled to the output unit 16, the input unit 17, the storage unit 18, the communication unit 19, and the drive 20.

The output unit 16 is formed of a liquid crystal display of any type, for example, to output various types of information. The input unit 17 is formed of hardware of any type, for example, to accept various types of information. The storage unit 18 is formed of a dynamic random access memory (DRAM), for example, to store various types of data. The communication unit 19 controls communications that take place among other devices (for example, the lender terminals 2-1 to 2-n, the borrower terminals 3-1 to 3-m, and the payment server 4 in FIG. 1) via the network N including the Internet.

The drive 20 is provided as required. The drive 20 is appropriately attached with a removable medium 30 such as a magnetic disk, an optical disk, a magnetic optical disk, or a semiconductor memory. A program read from the removable medium 30 by the drive 20 is installed into the storage unit 18 as required. Furthermore, the removable medium 30 is able to store various types of data stored in the storage unit 18, similar to the storage unit 18.

[Functional Configuration]

Figure 5:
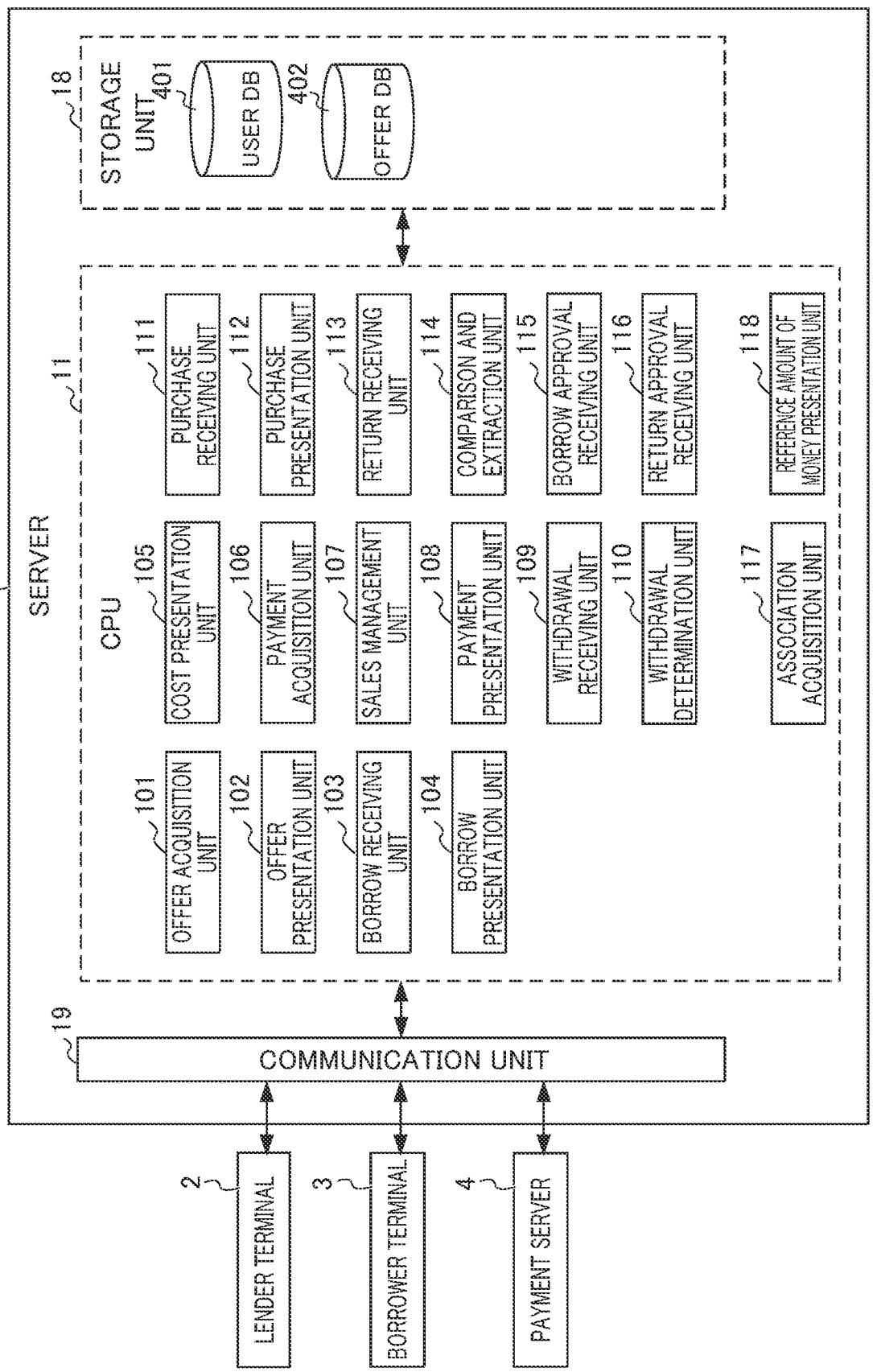
FIG. 5 is a functional block diagram, illustrating an example of a functional configuration of the management server in FIG. 4.

Next, functionality of the management server 1 will now be described herein with reference to FIG. 5. FIG. 5 is a functional block diagram illustrating an example of a functional configuration of the management server 1 in FIG. A.

As illustrated in FIG. 5, when matching processing is executed in the CPU 11 of the management server 1, an offer acquisition unit 101, an offer presentation unit 102, a borrow receiving unit 103, and a borrow presentation unit 104 are caused to function. When sales management processing is executed, a cost presentation unit 105, a payment acquisition unit 106, a sales management unit 107, a payment presentation unit 108, a withdrawal receiving unit 109, and a withdrawal determination unit 110 are caused to function. When ownership change processing is executed, a purchase receiving unit 111 and a purchase presentation unit 112 are caused to function. When image diagnosis processing is executed, a return receiving unit 113, a comparison and extraction unit. 114, a borrow approval receiving unit 115, and a return approval receiving unit 116 are caused to function. When appropriate price determination processing is executed, an association acquisition unit 117 and a reference amount of money presentation unit 118 are caused to function. In a region of the storage unit 18, a user database (DB) 401 and an offer DB 402 are provided.

The matching processing refers to processing of allowing each of the lender users UL1 to ULn to be matched with each of the borrower users UB1 to UBm.

The sales management processing refers to processing of managing a rental fee to be paid by each of the borrower users UB1 to UBm as a sales amount for each of the lender users UL1 to ULn.

The ownership change processing refers to processing of changing a right of receiving a rental fee of an offered item, together with an ownership right of the offered item, without changing the status that the offered item is being rented. The transfer destination of the ownership right is either the present service provider M or the borrower user UB. The ownership change processing refers to processing that is executable only in a case in which the lender user UL has expressed an intention of selling an item when the lender user UL has offered the item. Note that a specific aspect of the ownership change processing will be described later with reference to FIGS. 6 to 10.

The image diagnosis processing refers to processing of comparing with each other captured images of an offered item, which are respectively captured at timings when the offered item is offered and when the offered item is returned, and of extracting a difference. Therefore, it is possible to diagnose a change in condition (for example, form, pattern, and color) of an offered item during a rental period. Mote herein that a specific method of comparing captured images with each other is not particularly limited. For example, it is possible to adopt a desired method. In an example method, images of an offered item are captured at an identical distance and an identical angle at timings when the offered item is offered and the offered item is returned. The images are then caused to overlap with each other to extract a difference. In another example method, predetermined feature amounts are extracted from captured images. The extracted, predetermined feature amounts are then compared with each other. Note that a specific method of capturing an image of an offered item will be described later with reference to FIG. 12.

Guide price proposition processing refers to processing of calculating a price serving as a guide to a rental fee to be specified when the item is offered by the lender user UL, and of proposing the price. A specific method of calculating a price serving as a guide to a rental fee is not particularly limited. Specifically, for example, a price serving as a guide to a rental fee is calculated based on past trading results regarding an item that the lender user UL is about to offer. In another case, a price serving as a guide to a rental fee is calculated based on an average price at which bidders won similar items in the past in various auctions. As described above, it is also possible to calculate an average price at which bidders won similar items in auctions, based on trading results of the similar items offered in auctions, for example. Therefore, it is possible to estimate a rental fee linked to a target rate of return, a depreciation rate due to aging, and a rental period, for example, based on this average price.

(CPU)

The offer acquisition unit 101 acquires, as offer information, information regarding items, which is provided from each of one or more first users. Specifically, the offer acquisition unit 101 acquires offer information provided from each of the lender users UL1 to ULn registered as users of the present service. The acquired offer information is stored and managed in the offer DB 402.

The offer presentation unit 102 presents one or more pieces of the offer information acquired by the offer acquisition section to one or more second users. Specifically, the offer presentation unit 102 presents one or more pieces of the offer information acquired by the offer acquisition unit 101 to the borrower users UB1 to UBm. Therefore, the borrower users UB1 to UBm are able to recognize the offered items and their contents.

It is possible to include, in the one or more pieces of the offer information presented by the offer presentation unit 102, information regarding locations at which the items are to be delivered. Therefore, the borrower users UB1 to UBm are able to recognize the offered items and their contents, including the locations at which the items are to be delivered. Note that a specific example of "information regarding a location at which an item is to be delivered" will be described later with reference to FIG. 14.

Furthermore, the offer presentation unit 102 presents, to the one or more first users and the one or more second users, a record of the one or more pieces, which are presented to the one or more second users, of the offer information. Specifically, the offer presentation unit 102 presents, to the lender users UL1 to ULn and the borrower users UB1 to UBm, a record of the one or more pieces, which are presented to the borrower users UB1 to UBm, of the offer information. Therefore, the lender users UL1 to ULn and the borrower users UB1 to UBm are able to confirm the record of the one or more pieces, which are presented to the borrower users UB1 to UBm, of the offer information. Note that a specific example of "a record of one or more pieces of offer information" will be described later with reference to FIGS. 9 and 15.

The borrow receiving unit 103 receives, in a case in which there is an application of wanting to borrow an item from one of the one or more second users, the application as a borrow application. Specifically, the borrow receiving unit 103 receives, in a case in which there is an application from the borrower user UB of wanting to borrow one of items offered by the lender user UL, the application as a borrow application.

Furthermore, the borrow receiving unit 103 receives, in a case in which there is an application of wanting to extend a period of further borrowing the item, from the one of the one or more second users, the application as an extension application. Specifically, the borrow receiving unit 103 receives, in a case in which there is an application of wanting to extend a rental period from the borrower user UB, the application as an extension application. Note that a specific example when the borrower user UB makes an "extension application" will be described later with reference to FIG. 17.

The borrow presentation unit 104 presents, to a corresponding one of the one or more first users, that there is the borrow application. Specifically, the borrow presentation unit 104 presents, to the lender user UL who is the offeror, that there is the borrow application from the borrower user UB.

Furthermore, the borrow presentation unit 104 presents, to the corresponding one of the one or more first users, that there is the extension application. Specifically, the borrow presentation unit 104 presents, to the lender user UL who is the offeror, that there is the extension application from the borrower user UB. Note that, a specific example of an "extension application" presented to the lender user UL will be described later with reference to FIG. 18.

The cost presentation unit 105 presents a cost required to borrow the item to the one of the one or more second users, who has made the borrow application. Specifically, the cost presentation unit 305 presents rental and other fees required to borrow the item to the borrower user UB who has made the borrow application.

Furthermore, the cost presentation unit 105 presents a cost required to extend the period of further borrowing the item to the one of the one or more second users, who has made the extension application. Specifically, the cost presentation unit 105 presents additional rental and other fees required to extend the rental period to the borrower user UB who has made the extension application.

Upon the completion of the payment of the cost, the payment acquisition unit 106 acquires information indicating that the payment has been completed. Specifically, upon the completion of the payment processing of the rental and other fees by the payment server 4, the payment acquisition unit 106 acquires information indicating that the payment processing has been completed. The acquired information indicating that the payment processing has been completed is stored and managed in the offer DB 402.

The sales management unit 107 records and manages a predetermined amount of money in the cost as a sales amount. Specifically, the sales management unit 107 records and manages, as a sales amount, a remaining amount of money acquired by subtracting an amount of money that the payment service provider P should acquire from the rental and other fees.

The payment, presentation unit 108 presents, to the one of the one or more first users, that the payment has been completed. Specifically, upon the completion of the payment processing by the payment server 4, the payment presentation unit 108 presents, to the lender user UL, that the payment processing has been completed. Note herein that a specific method of presenting, to the lender user UL, that the payment processing has been completed is not particularly limited. For example, the fact that the payment processing has been completed may be displayed on the lender terminal 2, or may be notified to the lender user UL via a mail or by using a communication tool such as a social networking service (SNS).

The withdrawal receiving unit 109 receives, in a case in which there is an application of wanting to withdraw at least a part of a sales amount from one of the one or more first users, the application as a withdrawal application. Specifically, in a case in which the lender user UL wants to cash a sales amount of an offered item, the lender user UL operates the lender terminal 2 to make a withdrawal application to the present service provider M. The withdrawal receiving unit 109 then receives the application as a withdrawal application from the lender user UL.

The withdrawal determination unit 110 determines, based on a content of the withdrawal application, an amount of money the one of the one or more first users is allowed to withdraw from the sales amount. Specifically, the withdrawal determination unit 110 determines, based on the content of the withdrawal application from the lender user UL, an amount of money the lender user UL is allowed to withdraw from the sales amount. The amount of money the lender user UL is allowed to withdraw from the sales amount is equal to an amount of money acquired by subtracting a service fee that the lender user UL should bear from the sales amount.

The purchase receiving unit 111 receives, in a case in which there is an application of wanting to buy the item, from the one of the one or more second users, who has been borrowing the item, the application as a purchase application. The borrower user UB who has been borrowing an offered item may want to buy the offered item being rented. As described above, the offer information provided from the lender user UL when the item is offered includes information regarding whether the offered item is sellable. Therefore, in a case in which there is the intention of selling the offered item, the borrower user UB who has been borrowing the offered item is able to make a purchase application. Specifically, in a case in which there is a purchase application for the offered item from the borrower user UB who has been borrowing the offered item, the purchase receiving unit 111 receives the purchase application.

The purchase presentation unit 112 presents, to the corresponding one of the one or more first users, that there is the purchase application. Specifically, in a case in which there is the purchase application from the borrower user UB, the purchase presentation unit 112 presents to the lender user UL that there is the purchase application. Note herein that a specific method of presenting, to the lender user UL, that there has been a purchase application from the borrower user U3 is not particularly limited. For example, the fact that there is the purchase application may be displayed on the lender terminal 2, or may be notified to the lender user UL by using a communication tool such as a mail or an SNS.

The return receiving unit 113 receives, in a case in which a borrow period of an item expires, return information at least including a captured image of the item at the time of expiration of the borrow period. The borrower user UB operates the borrower terminal 3 upon the expiration of the rental period for the offered item to capture an image of the offered item, and to send, to the management server 1, information at least including image information based on the captured image (hereinafter referred to as "return information"). The return receiving unit 113 then receives the return information that has been sent.

The comparison and extraction unit 114 compares the captured image included in the offer information with the captured image included in the return information, and extracts a difference. As described above, the offer information includes the captured image of the offered item. The comparison and extraction unit 114 compares the captured image included in the offer information with the captured image included in the return information sent from the borrower terminal 3, and extracts a difference.

The borrow approval receiving unit 115 receives approval of the one of the one or more second users who has borrowed the one of the items, in a case in which the one of the one or more second users has approved a difference in condition between an actual item of the item when the one of the one or more second users received the item and the item displayed in the captured image included in the offer information. When the offered item has been delivered to the borrower user UB, the borrower user UB having received the offered item visually compares the captured image of the offered item, which is included in the offer information provided by the lender user UL, with the actual item. If there are no discrepancies between the captured image and the actual item as a result of the visual comparison by the borrower user UB, or if the discrepancy is regarded as acceptable, the borrower user UB then operates the borrower terminal 3, as described above, to send, to the management server 1, information indicating the start of the rental. Specifically, for example, although not illustrated, pressing the "Approve" button or the "Start rental" button displayed on the borrower terminal 3 sends the information indicating the start of the rental to the management server 1. The management server 1 then receives the information, accepting that the borrower user UB has approved the start of the rental. Therefore, it is possible to prevent the lender users UL from committing an act of dishonesty, such as use of a captured image of a new item to serve as a captured image of an offered item included in offer information and use of a captured image of an item, where scratches and other abnormalities are hidden through image processing.

The return approval receiving unit 116 receives approval of the corresponding one of the one or more first users who has lent the item, in a case in which the corresponding one of the one or more first users has approved a difference in condition between an actual item of the item when the item has been returned to the corresponding one of the one or more first users and the item displayed in the captured image included in the return information. When the offered item has been returned to the lender user UL, the lender user UL having received the offered item visually compares the captured image of the offered item, which is included in the return information provided by the borrower user UB, with the actual item. If there are no discrepancies between the captured image and the actual item as a result of the visual comparison by the lender user UL, or if the discrepancy is regarded as acceptable, the lender user UL then operates the lender terminal 2 to send, to the management server 1, information indicating that the return of the item has been successfully completed. Specifically, for example, although not illustrated, pressing the "Approve" button or a "Return completed" button displayed on the lender terminal 2 sends information indicating that the return has been successfully completed to the management server 1. The management server 1 then receives the information, accepting that the lender user UL has approved the return. Therefore, it is possible to prevent the borrower users UB from committing an act of dishonesty, with respect to a use of a captured image included in offer information as a captured image of an offered item included in return information or such a use which scratches left during a rental period are hidden through image processing.

The association acquisition unit 117 acquires trading results of other items associated with an item. Specifically, the association acquisition unit 117 acquires trading results in auctions, for example, of other items associated with the offered item. Furthermore, the association acquisition unit 117 acquires results of rental fees of other offered items similar to the offered item, such as other offered items belonging to an identical category to the category to which the offered item belongs, as trading results of other items associated with the item.

The reference amount of money presentation unit 118 presents a price range for a cost of the item, based on the acquired trading results. Specifically, the reference amount of money presentation unit 118 presents a price range for a rental fee of the offered item, based on the trading results, which are acquired by the association acquisition unit 117, in auctions, for example, of the other items associated with the offered item. The lender user UL is thus able to check a reference price when determining a rental fee of the offered item.

Furthermore, the reference amount of money presentation unit 118 presents results, which are acquired by the association acquisition unit 117, of rental fees of other offered items similar to the offered item. Therefore, for example, the lender user UL and the borrower user UB are able to compare an offered item with offered items belonging to the same category as the offered item to gain knowledge of the transition of each rental fee. Note that a specific example of "results of rental fees of other offered items similar to an offered item" will be described later with reference to FIG. 15.

(Storage unit)

In the user DB 401, information (hereinafter referred to as "user information") regarding users (the lender users UL and the borrower users UB) having undergone user registration for the present service is stored and managed. The user information includes information (for example, IDs) uniquely identifying users having undergone user registration for the present service and information such as names, addresses, contacts, offer records, borrow records, ownership change records, and reviews by other users.

In the offer DB 402, offer information of offered items offered in the present service is stored and managed.

[Specific Examples]

Figure 6:
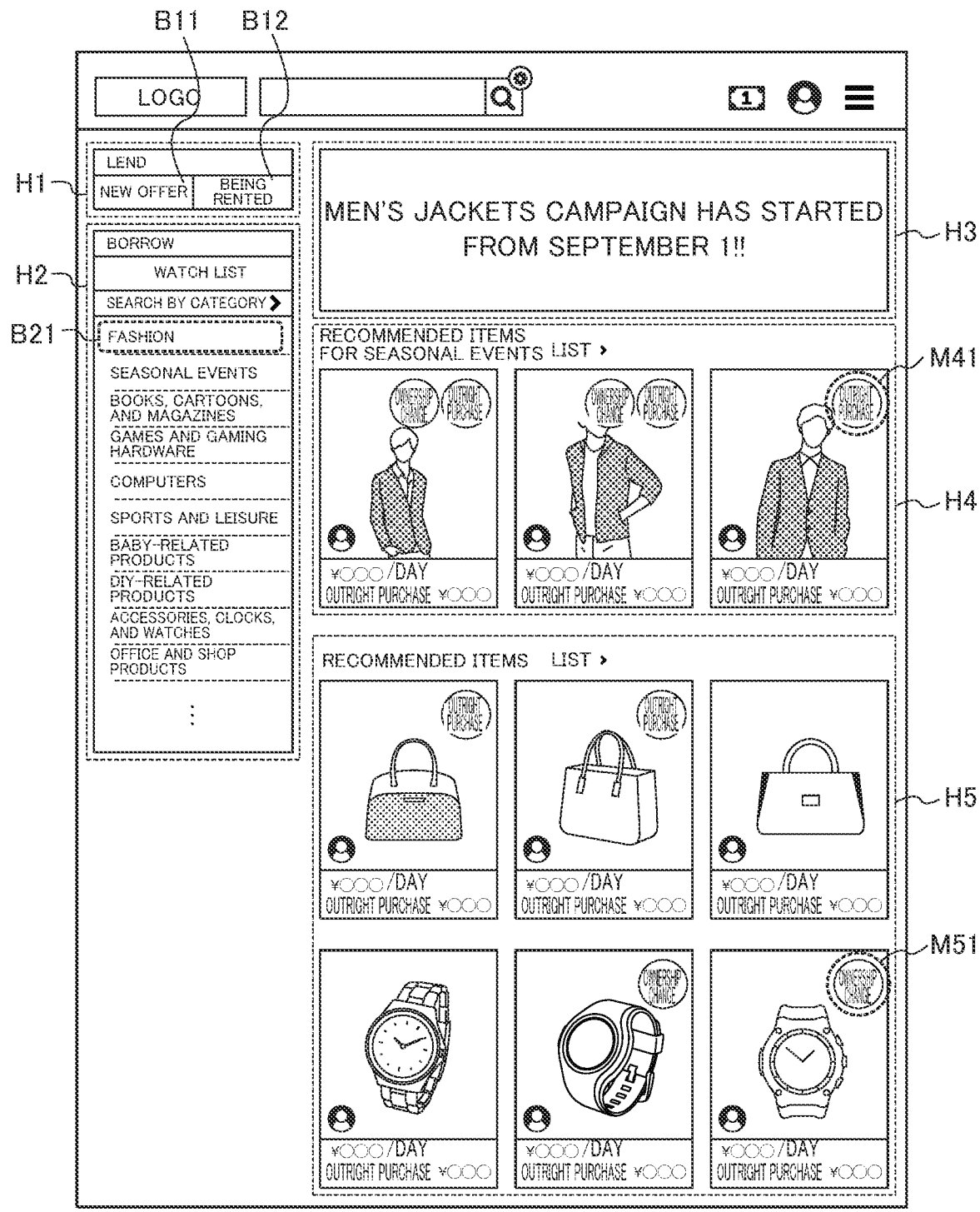
FIG. 6 is a view illustrating an example case of making a borrow application via a graphical user interface (GUI) displayed on each of lender terminals and borrower terminals.

Next/specific examples of operations to offer an item or to make a borrow application will now be described herein with reference to FIGS. 6 to 18. FIG. 6 is a view illustrating an example case of making a borrow application via a graphical user interface (GUI) displayed on each of the lender terminals 2 and the borrower terminals 3.

The screen illustrated in FIG. 6, among screens to be displayed on each of the lender terminals 2 and the borrower terminals 3, is formed to include display regions H1 to H5.

In the display region H1, buttons to be pressed in a case in which a user of the present service plays a role as the lender user UL to offer an item are displayed. Specifically, as illustrated in FIG. 6, a button B11 displayed as "New offer" and a button B12 displayed as "Being rented" are displayed. Note herein that, when the button B11 displayed as "New offer" is pressed, the screen transitions to a screen illustrated in FIG. 11. Note that a specific example of an operation in a case in which a user of the present service plays a role as the lender user UL to offer an item will be described later with reference to FIG. 11. Furthermore, when the button B12 displayed as "Being rented" is pressed, a list of offered items that the user of the present service is lending as the lender user UL appears. Specifically, for example, when the button B12 displayed as "Being rented" is pressed, the screen may transition to a screen (My Page) illustrated in FIG. 10 to display the list of lent offered items. Note that a specific example of a list of lent offered items will be described later with reference to FIG. 10.

In the display region H2, buttons to be pressed in a case in which a user of the present service plays a role as the borrower user UB to borrow an offered item are displayed. Specifically, those displayed as illustrated in FIG. 6 include a button displayed as "Watch list", a button displayed as "Search by category", and, as various buttons indicating categories, a button B21 displayed as "Fashion", a button displayed as "Seasonal events", and a button displayed as "Books, cartoons, and magazines", for example. Note that specific contents of other categories that the buttons indicate are as illustrated in the display region H2 in FIG. 6.

In the display region H3, an announcement or an advertisement to the user is displayed. In the example illustrated in FIG. 6, the announcement "Men's jackets campaign has started from September 1!!" is displayed. It is also possible to press, as a button, an announcement or an advertisement displayed in the display region H3. In this case, when the announcement illustrated in FIG. 6 is pressed, a special screen (not illustrated) indicating a specific content of the announcement may be displayed.

In the display region H4, three captured images of men's jackets are selected, from among the offered item offered by the lender users UL1 to ULn, and displayed as "Recommended items for seasonal events", together with their offer information. Note that the term "item" used herein means an offered item offered by each of the lender users UL.

In the display region H5, three captured images of handbags and three captured images of wristwatches are selected, from among the offered items offered by the lender users UL1 to ULn, and displayed as "Recommended items", together with their offer information. The borrower users UB are able to see the contents displayed in the display regions H2 to H3 to easily find a desired offered item.

Some of the offered items respectively displayed in the display regions H4 and H5 feature an "outright purchase" mark M41 or an "ownership change" mark M51.

The "outright purchase" mark M41 featured on the offered items means that the respective offer information includes an intention to sell. That is, it means that each of the lender users UL thinks that the offered item "may be taken over" after a predetermined rental period has expired. Specifically, for example, when an offered item worth a value of 10000 yen is lent at a price of 100 yen per day, and when a rental period reaches 100 days, a total sales rental fee reaches 10000 yen. In this case, the lender user UL may take the view that "the base price has been recovered" and that the offered item may be taken over as is by the borrower user UB. Therefore, in the offer information of the offered items respectively displayed in the display regions H4 and H5 in FIG. 6, outright purchase amounts are displayed in addition to rental fees per day.

Furthermore, the offered items featuring the "ownership change" mark M51 are offered items for which it is possible to change a right of receiving a rental fee of each of the offered items, together with an ownership right of each of the offered items, without changing a status that each of the offered items is being rented. That is, it means that it is possible to change the ownership right of the offered item to the present service provider M or any of the borrower users UB, while the right of receiving the rental fee is reserved.

Figure 7:
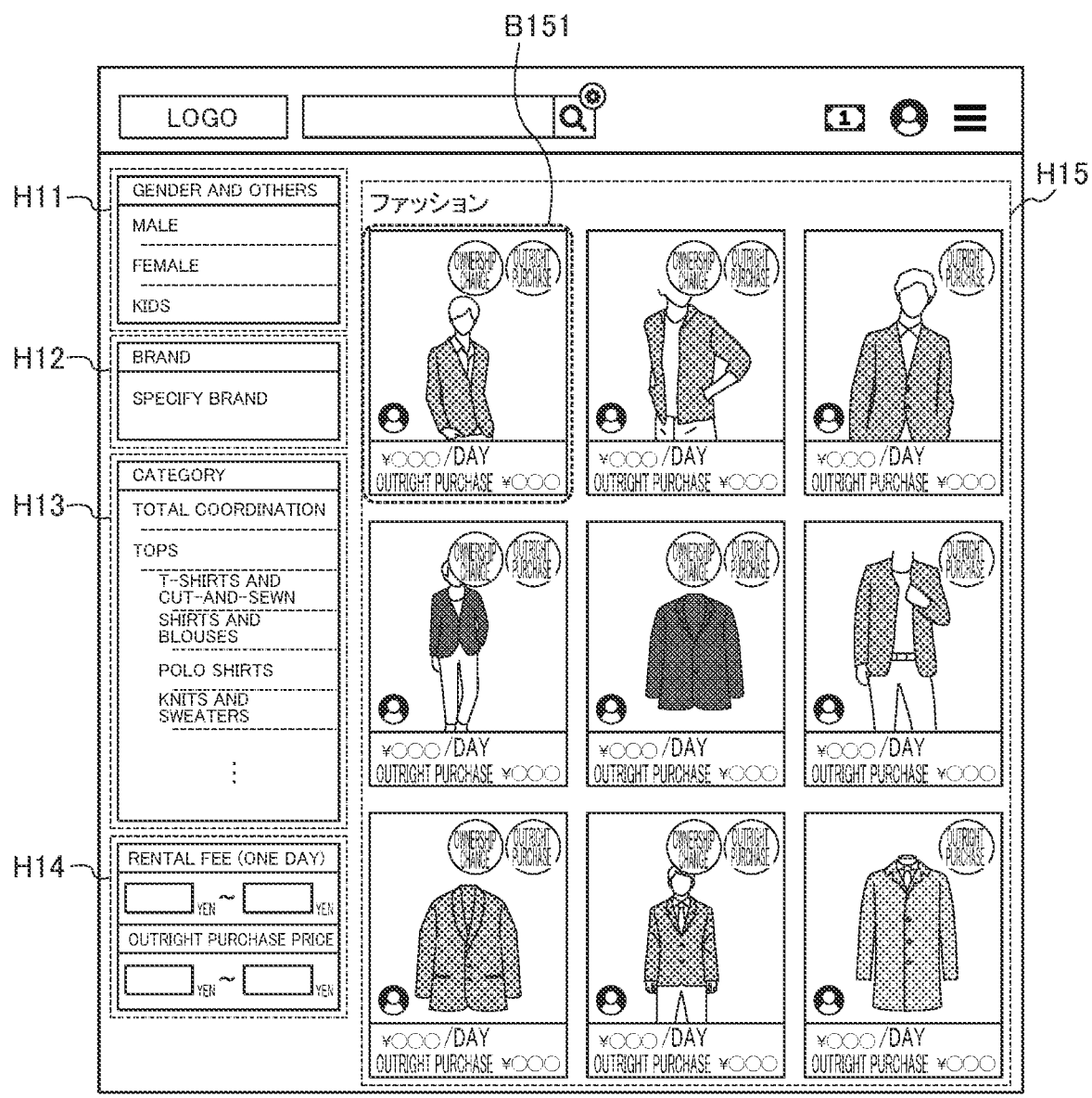
FIG. 7 is a view illustrating a specific example of a screen displayed on each of the lender terminals and the borrower terminals, in a case in which a button indicating a "Fashion" category among categories displayed in FIG. 6 has been pressed.

FIG. 7 is a view illustrating a specific example of a screen displayed on each of the lender terminals 2 and the borrower terminals 3, in a case in which the button B21 indicating the "Fashion" category, among the categories displayed in the display region H2 in FIG. 6, has been pressed.

The screen illustrated in FIG. 7, among the screens to be displayed on each of the lender terminals 2 and the borrower terminals 3, is formed to include display regions H11 to H1S.

In the display regions H11 to H14, buttons and entry fields are displayed, which are used to narrow down, with other parameters, the plurality of offered items extracted under the "Fashion" category. Therefore, the borrower user UB is able to efficiently find a desired offered item.

In the display region H11, the buttons are displayed, which are used to narrow down, with a parameter of Gender and others, the plurality of offered items extracted under the "Fashion" category. Specifically, there are the button displayed as "Men's" used to narrow down offered items for men, the button displayed as "Women's" used to narrow down offered items for women, and the button displayed as "Kids" used to narrow down offered items for kids.

In the display region H12, the button is displayed, which is used to narrow down, with a parameter of brand, the plurality of offered items extracted under the "Fashion" category. Specifically, the button indicating "Specify brand" is displayed. When the button indicating "Specify brand" is pressed, the screen transitions to a screen used to specify a brand. For example, when the button indicating "Specify brand" is pressed, a pop-up screen listing specific brand names may appear.

In the display region H13, the buttons are displayed, which are used to narrow down, with a subcategory, the plurality of offered items extracted under the "Fashion" category. Specifically, the buttons being displayed are the "Total coordination" button used to narrow down the offered items with a subcategory of total coordination, the "Tops" button used to narrow down the offered items with a subcategory of tops, the "T-shirts and cut-and-sewn" button used to narrow down the offered items with a subcategory of T-shirts and cut-and-sewn that is a further-subcategory of the subcategory, i.e., a subcategory to the tops subcategory, the "Shirts and blouses" button used to narrow down the offered items with a subcategory of shirts and blouses, the "Polo shirts" button used to narrow down the offered items with a subcategory of polo shirts, and the "Knits and sweaters" button used to narrow down the offered items with a subcategory of knits and sweaters.

In the display region H14, the price entry fields are displayed, which are used to narrow down the plurality of offered items extracted under the "Fashion" category with a rental fee or an outright purchase price per day. Therefore, the borrower user UB is able to efficiently find a desired offered item within a budget.

In the display region H1S, captured images of the plurality of offered items extracted under the "Fashion" category are displayed, together with their offer information. When the borrower user UB finds a desired offered item or is interested in an offered item, from among the captured images of the plurality of offered items displayed in the display region H15, the borrower user UB performs an operation of pressing the captured image. For example, when a button B151 indicating one of the offered items is pressed, a screen appears, indicating detailed information of the offered item. Note that a specific example of the screen displayed when the button B151 is pressed will be described later with reference to FIG. 8.

Figure 8:
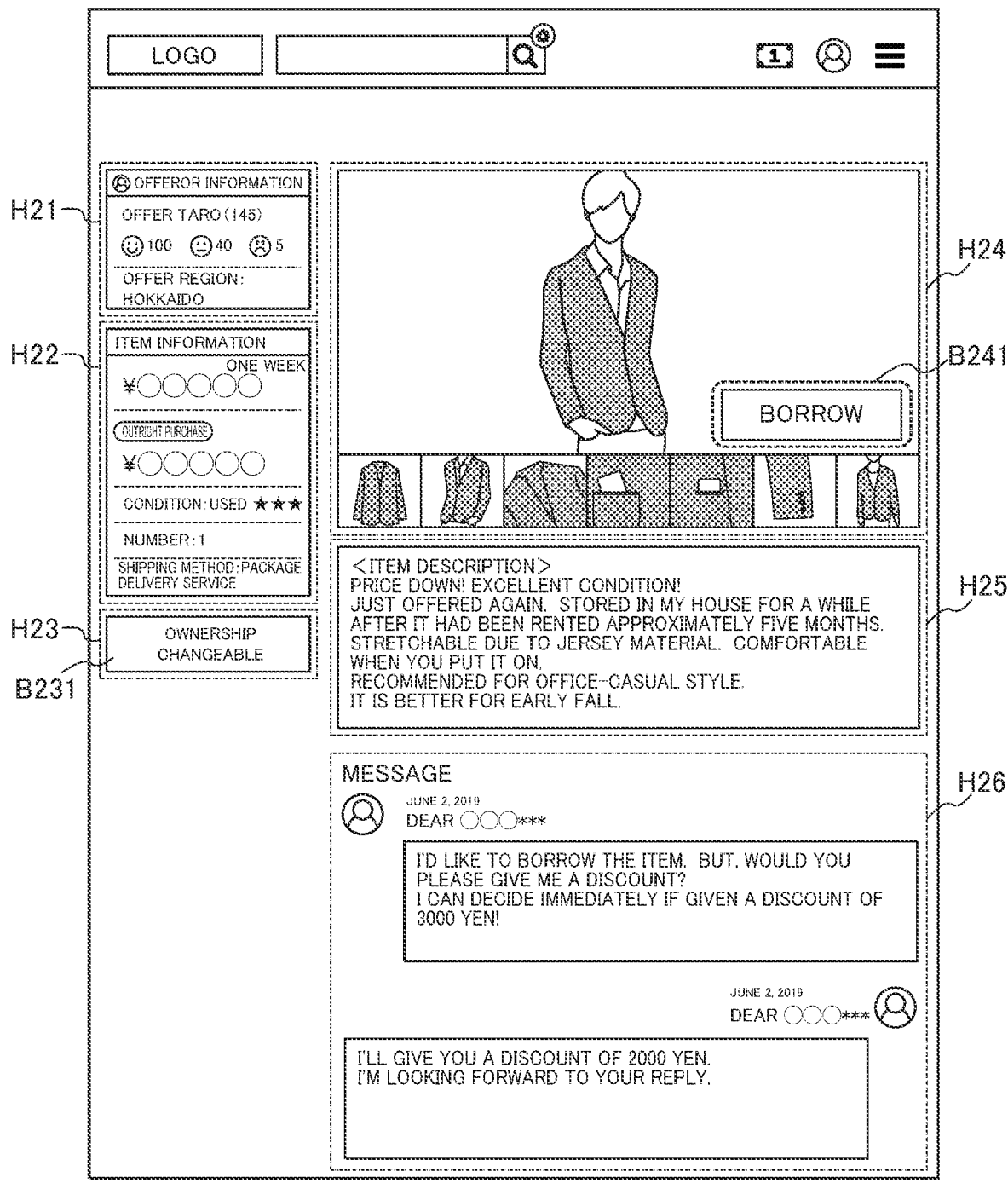
FIG. 8 is a view illustrating a specific example of a screen displayed on each of the lender terminals and the borrower terminals, in a case in which a button displayed in FIG. 7 has been pressed.

FIG. 8 is a view illustrating the specific example of the screen displayed on each of the lender terminals 2 and the borrower terminals 3, in a case in which the button B151 displayed in the display region H15 in FIG. 7 has been pressed.

The screen illustrated in FIG. 8, among the screens to be displayed on each of the lender terminals 2 and the borrower terminals 3, is formed to include display regions H21 to H26.

In the display region H21, a part of user information of the lender user UL who has offered the offered item illustrated in FIG. 8 is displayed as "Offeror information". Specifically, those displayed include a name (Offer Taro) of the lender user UL playing a role as the offeror, a total count (145) of reviews by other users, breakdown of the reviews by other users, and an offer region (Hokkaido). Those displayed in the breakdown of the reviews by other users in the region include a count of reviews rated as "Good"(100), a count of reviews rated as "Average" (40), and a count of reviews rated as "Poor" (5). Note herein that the offer region is regarded as important information when one takes into account a shipping fee.

In the display region H22, a part of offer information of the offered item is displayed as "Item information". Specifically, those displayed include a rental fee (ooooo yen) per week, an outright purchase price (ooooo yen), condition (Used: ***), number of items (1), and a shipping method (package delivery service) for the offered item.

In the display region H23, whether an ownership change is available is described. In the example in FIG. 8, it is displayed that an ownership change is available as "Ownership changeable". Note herein that the part displayed as "Ownership changeable" represents a button B231 that is able to be pressed. When the button B231 is pressed, the screen transitions to a screen used to operate an ownership change, as illustrated in FIG. 9. Mote that a specific example of the operation of performing an ownership change will be described later with reference to FIG. 9.

In the display region H24, a plurality of captured images of the offered items are displayed. Therefore, the borrower user UB is able to easily know the condition of the offered item. Furthermore, in the display region H24, a "Borrow" button B241 is displayed, which is to be pressed when the borrower user UB makes a borrow application. The borrower users UB is able to press the "Borrow" button B241 to make the borrow application.

In the display region H25, the description of the offered item is displayed. Therefore, the borrower user UB is able to easily acquire the specific information regarding the offered item. In the example in FIG. 8, the description "Price down! Excellent condition!. Just offered again. Stored in my house for a while after it had been rented approximately five months. Stretchable due to jersey material. Comfortable when you put it on. Recommended for office-casual style. It is better for early fall." is displayed as "<Item description>".

In the display region H26, a communication tool used between users is displayed. The communication tool allows users to exchange messages, making it possible to exchange detailed information regarding an offered item and to negotiate its price, for example. As a result, it is possible to achieve smooth trading between the users. Specifically, an inquiry message "I'd like to borrow the item. But, would you please give me a discount? I can immediately decide if given a discount of 3000 yen!", from the borrower user UB to the lender user UL, and a reply message "I'll give you a discount of 2000 yen. I'm looking forward to your reply.", from the lender user UL to the borrower user UB, are exemplified.

FIG. 9 is a view illustrating a specific example of the screen displayed on each of the lender terminals 2 and the borrower terminals 3, in a case in which the button B231 displayed as "Ownership changeable" in the display region H23 in FIG. 8 has been pressed.

The screen illustrated in FIG. 9, among the screens to be displayed on each of the lender terminals 2 and the borrower terminals 3, is formed to include display regions H31 to H36.

In the display region H31, the part of the user information of the lender user DL who has offered the offered item illustrated in FIG. 8 is displayed as "Offeror information". Note that, since the content displayed in the display region H31 is identical to the content displayed in the display region H21 in FIG. 8, its description is omitted.

In the display region H32, a button B321 is displayed, which is used to approach the current owner of the offered item regarding ownership change. When the button B321 is pressed, the intention of an ownership change is notified to the current, owner of the offered item.

In the display region H33, a current rental fee (10000 yen/month) and a "Recent monthly rate of return" of "15% (15000 yen/month)" are displayed as "Reference current price". That is, the rental fee (15000 yen) that could be earned through lending in recent one month and the ratio (15%) that the rental fee occupies in the reference current price (100000 yen) are displayed. Furthermore, in the display region H33, a button B331 displayed as "Check auction price" is also displayed. When the button B331 is pressed, trading prices of identical or similar offered items offered in other auction sites appear. Therefore, a comparison with trading prices in auctions becomes easy.

In the display region H34, information regarding results of past lending is displayed as "Lending log". Therefore, it is possible to view, in a list, periods during which the offered item had been lent for what rental fees. That is, it is possible to view, in a list, as a log, who had borrowed the item, and frequencies and prices at which the item had been borrowed, and, in addition, condition and reviews on the item. Specifically, for example, the recent period when the item had been lent was a period of one month from February 22 to Mar. 22, 2018, and the rental fee was 15000 yen that is converted into a monthly fee. Note that other contents of the specific example indicated in the lending log are as illustrated in the display region H34 in FIG. 9.

In the display region H35, a graph illustrating a guide rental fee for the offered item is displayed as "Reference depreciation table". Specifically, in a graph region where a vertical axis illustrates a "guide rental fee" and a horizontal axis illustrates a "time", a straight line L1 falling diagonally from top left to bottom right and a straight line L2 orthogonal to the horizontal axis are displayed. The straight line L1 falling diagonally from top left to bottom right illustrates the guide rental fee when an outright purchase price for the offered item is 40000 yen. The straight line L2 orthogonal to the horizontal axis illustrates conditions to lend the offered item at this time.

In the display region H36, messages exchanged between the users regarding the offered item are displayed. It is also possible to exchange messages regarding an ownership change. Note that, since the content displayed in the display region H31 is identical to the content displayed in the display region H26 in FIG. 8, its description is omitted.

Figure 10:
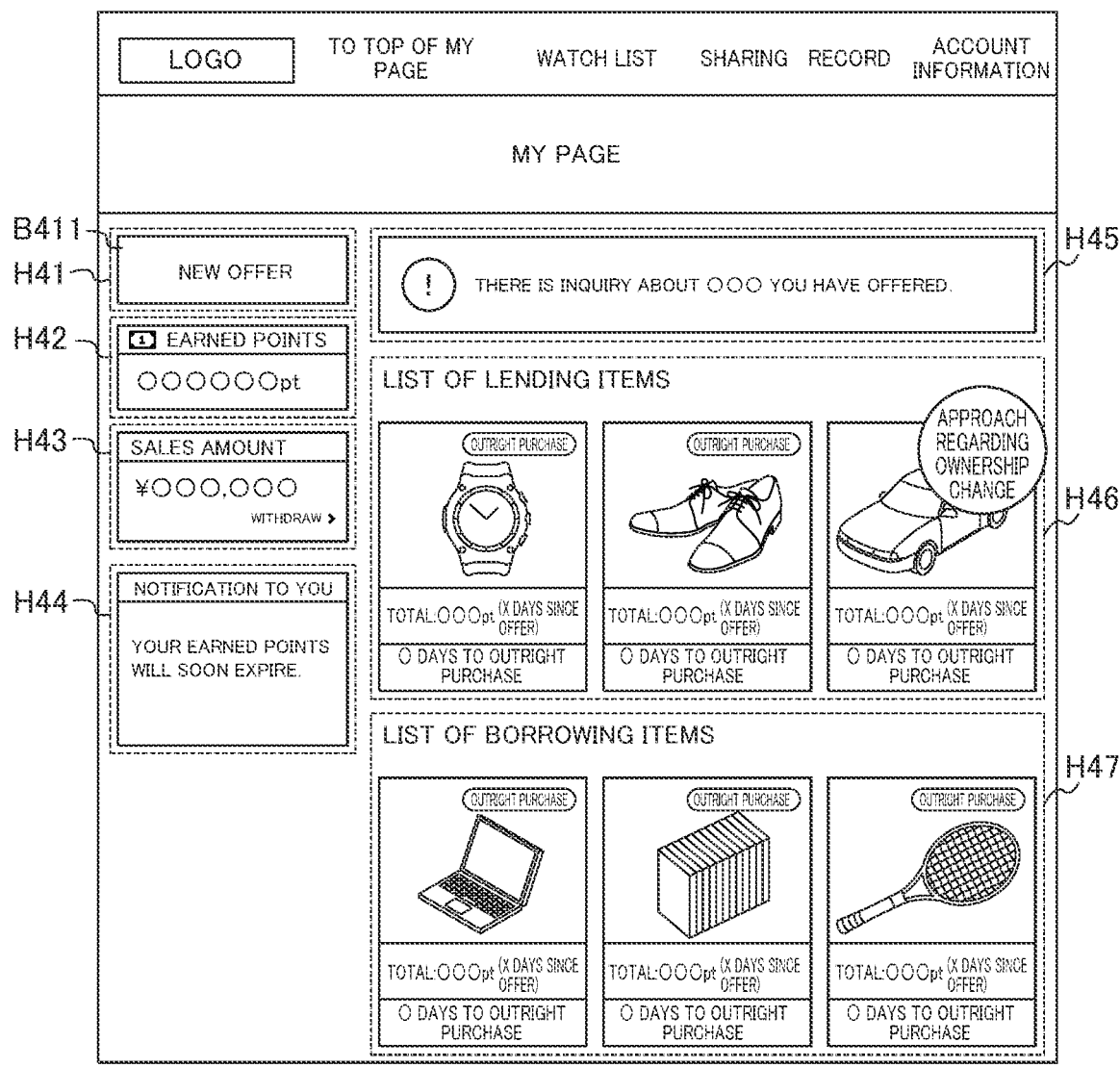
FIG. 10 is a view illustrating a specific example of My Page displayed on each of the lender terminals and the borrower terminals.

FIG. 10 is a view illustrating a specific example of My Page displayed on each of the lender terminals 2 and the borrower terminals 3.

The screen illustrated in FIG. 10, among the screens to be displayed on each of the lender terminals 2 and the borrower terminals 3, is formed to include display regions H41 to H47.

In the display region H41, a button B411 to be pressed in a case in which an item is to be newly offered is displayed as "New offer". When the button B411 is pressed, the screen transitions t.o a screen used t.o perform an operation for New offer. Note that a specific example of performing the operation for New offer will be described later with reference to FIG. 11.

In the display region H42, points earned by the user are displayed as "Earned points". In the display region H43, a sales amount earned by the user playing a role as the lender user UL is displayed as "Sales amount". As described above, it is possible to treat both the "Points" and the "Sales amount" as currencies to be exchanged in the present service. The points in the region will be added through various campaigns, for example. Furthermore, more points will be added to the borrower users UB who have had borrowed offered items with extreme care without leaving any damage and are thus reviewed as excellent. It is also possible to use the points to pay a rental fee. However, the points are set with an expiration period (for example, a half year after the points are earned). It is possible to anytime withdraw in cash the sales amount, as described above. Furthermore, it is also possible to use the sales amount to pay a rental fee. Furthermore, it is also possible to change the sales amount to points. Furthermore, a credit card may be used to pay a rental fee, together with the points and the sales amount in a combined manner.

In the display region H44, a notification from the present service provider M to the user is displayed as "Notification to you". Specifically, in the example illustrated in FIG. 10, a notification "Your earned points will soon reach expiration period." is displayed.

In the display region H45, a trading-related message to the user is displayed. Specifically, in the example illustrated in FIG. 10, a notification "There is inquiry about ooo you have offered." is displayed.

In the display region H46, a list of offered items currently being lent to other users (the borrower users UB) is displayed as "List of lending items". For each of the offered items displayed in the list, points, lending days, and remaining days to outright purchase are displayed. Furthermore, for offered items for which consultation for ownership change has been made, a message to that effect is displayed.

In the display region H47, a list of offered items currently being borrowed from other users (the lender users UL) is displayed as "List of borrowing items". For each of the offered items displayed in the list, points, lending days, and remaining days to outright purchase are displayed.

Figure 11:
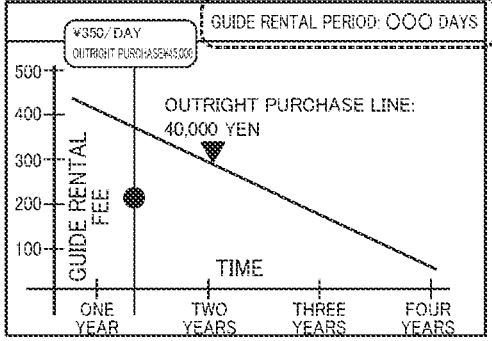
FIG. 11 is a view illustrating a specific example of an operational screen in a case in which an operation for a new offer is performed.

FIG. 11 is a view illustrating a specific example of the operational screen in a case in which the operation for New offer is performed.

The screen illustrated in FIG. 11, among the screens to be displayed on each of the lender terminals 2, is formed to include display regions H51 to H54.

In the display region H51, fields used to enter basic information about an item, to be newly offered are displayed as "Basic item information". Specifically, those displayed as the basic information include, a field used to select and enter whether the item is linked to Facebook (registered trade mark), a field used to select and enter an item category, and a field used to select and enter an item subcategory, for example. When the basic information has been entered, and a button B511 displayed as "Register" is pressed, the basic information is registered. Note that the basic information is not limited to include the items displayed in FIG. 11. It is possible to include various items in the basic information.

In the display region H52, a list indicating offer situations in auctions, for example, of items similar to the item to be newly offered is displayed as "Information of similar items". When a button B521 displayed as "Select" is pressed in the region, information regarding the item is displayed. Therefore, comparisons with prices and contents of items being traded in auctions, for example, become easy.

In the display region H53, a tool for estimating a rental fee of an item to be newly offered at a reasonable level is provided as "Calculate rental fee from similar items". Specifically, those displayed in a display region H531 in the display region H53 include a field used to enter a target rate of return, a field used to enter a rental period, and a check box used to set whether outright purchasing is available. Furthermore, in a display region H533 in the display region H53, a price (250 yen per day) is displayed, serving as a guide to a rental fee of the item to be newly offered. Furthermore, in a display region H533 in the display region H53, a period serving as a guide to a rental period of the item to be newly offered is displayed as "Guide rental period", which has been estimated and calculated.

In the display region H54, a field used to enter detailed information of the item to be newly offered is displayed as "Detailed item information". Specifically, the field is displayed, which is used to register, as a piece of the detailed information, a captured image of the item to be newly offered. Note that a character to be entered as a piece of the detailed information is not limited to a captured image described above. It is possible to provide a plurality of characters. When the detailed information has been entered, and a button B541 displayed as "Register" is pressed, the detailed information is registered.

Figure 12:
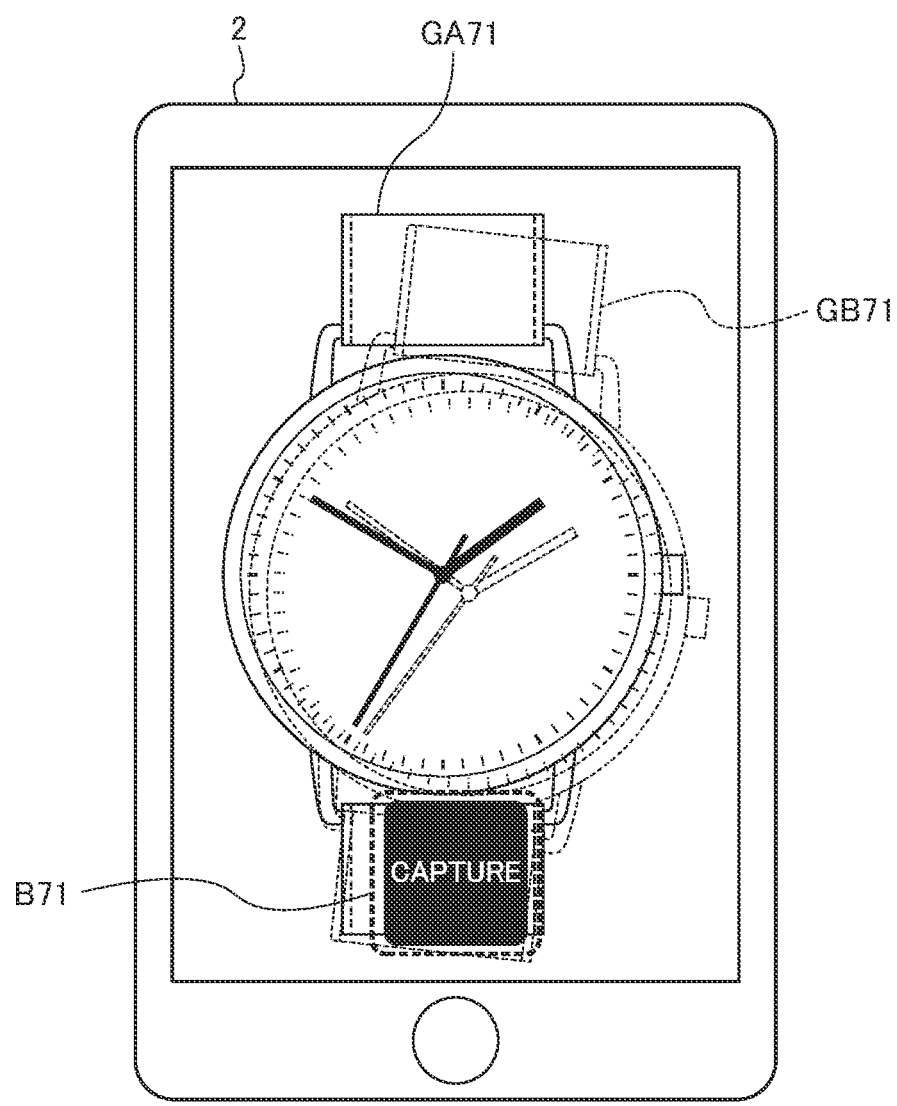
FIG. 12 is a view illustrating a specific example of an operational screen displayed on each of the borrower terminals, in a case in which an operation of selecting a category to which an offered item that a borrower user desires is assumed to belong is performed.

FIG. 12 is a view illustrating a specific example of an operational screen displayed on each of the borrower terminals, in a case in which an operation of selecting a category to which an offered item that the borrower user desires is assumed to belong is performed.

The screen illustrated in FIG. 12, among the screens to be displayed on each of the borrower terminals 3, is formed to include display regions H61 to H63.

In the display region H61, buttons respectively indicated as "Search", "Notification", "Item", "Offer", and "Others" are displayed as menu buttons. The button indicated as "Search" is a button to be pressed in a case in which a user of the present service plays a role as the borrower user UB to search for a desired offered item. The button indicated as "Notification" is a button to be pressed in a case in which the user of the present service desires to make various notification settings. The button indicated as "Item" is a button to be pressed in a case in which the user of the present service desires to display a list of offered items. Note that the term "Item" means an offered item. The button indicated as "Offer" is a button to be pressed in a case in which the user of the present service plays a role as the lender user UL to offer an item.

When the button indicated as "Search" in the region is pressed, the screen illustrated in FIG. 12 appears on the borrower terminal 3. Therefore, the borrower user UB is able to select, among offered items, a category to which an offered item that the borrower user UB desires is assumed to belong, and to cause offered items belonging to the category to be displayed in a list. That is, to rent an item, it is necessary to search for those items that satisfy requirements, from among similar items. Therefore, in the present service, a search function that is able to support both a "Rough" search and a "Fine" search is provided. Therefore, the borrower user UB is able to promptly access a desired offered item. Note that the operational screen used to select a category, as illustrated in FIG. 12, is an operational screen used to perform a "Rough" search.

In the display region H62, a keyword entry field R161 is displayed, which is used to perform a simple search. The borrower user UB is able t.o directly enter a name, for example, of an offered item that the borrower user UB desires in the keyword entry field R161 indicated as "What you want to borrow right, now is . . . " to perform a simple search.

In the display region H63, a list of categories for offered items is displayed. In the display region H63, performing an operation of swiping makes it possible to achieve sliding display in either a left or right direction. Therefore, it is possible to cause the borrower terminal 3 to display all categories for offered items. Note that, in the example in FIG. 12, "Tools and DIY", "Video apparatuses", "New arrivals", "Ladies'", and "Men's" are displayed as the categories. From among the categories, "New arrivals" is selected.

In a display region H64, thumbnail images of offered items belonging to the category selected in the display region H63, from among the offered items, are displayed in a list, together with parts of information indicating the offered items. In the display region H64, performing an operation of swiping makes it possible to achieve sliding display in either an up or down direction. Therefore, it is possible to cause the borrower terminal 3 to display all the offered items belonging to the category selected in the display region H63. As described above, in the example in FIG. 12, since "New arrivals" is displayed as the category, thumbnail images of the offered items belonging to the category of "New arrivals" are displayed in a list, together with parts of information indicating the offered items. Specifically, for example, in FIG. 12, for offered items belonging to four categories of wristwatches, vehicles, lap-top personal computers, and tennis rackets, respectively, those displayed include their thumbnail images, names of the offered items (for example, "ooo"), rental fees per day (for example, "ooo yen/day"), and reviews for the offered items (for example, "*5"). In a case in which the borrower user UB finds an offered item of interest, the borrower user UB presses a button B601 indicated with a heart mark displayed per offered item. Therefore, the target offered item is stored as a "Favorite" one.

Furthermore, in the display region H64, the button B601 indicated as "Map" is displayed and partially superimposed on the list of offered items. When the button B601 is pressed, a map is displayed, plotting locations to which the offered items displayed in the list are able to be delivered. Therefore, the borrower user UB is able to check the locations at which the offered item is actually received, making it possible to narrow down offered items that are to be delivered at nearby locations for the borrower user UB. That is, it is possible to use distances from a current location as variables to narrow down items. As a result, the borrower user UB is able to reduce a shipping fee of an offered item that the borrower user UB desires. Note that a specific example of the map plotting locations to which offered items are able to be delivered will be described later with reference to FIG. 14.

Figure 13:
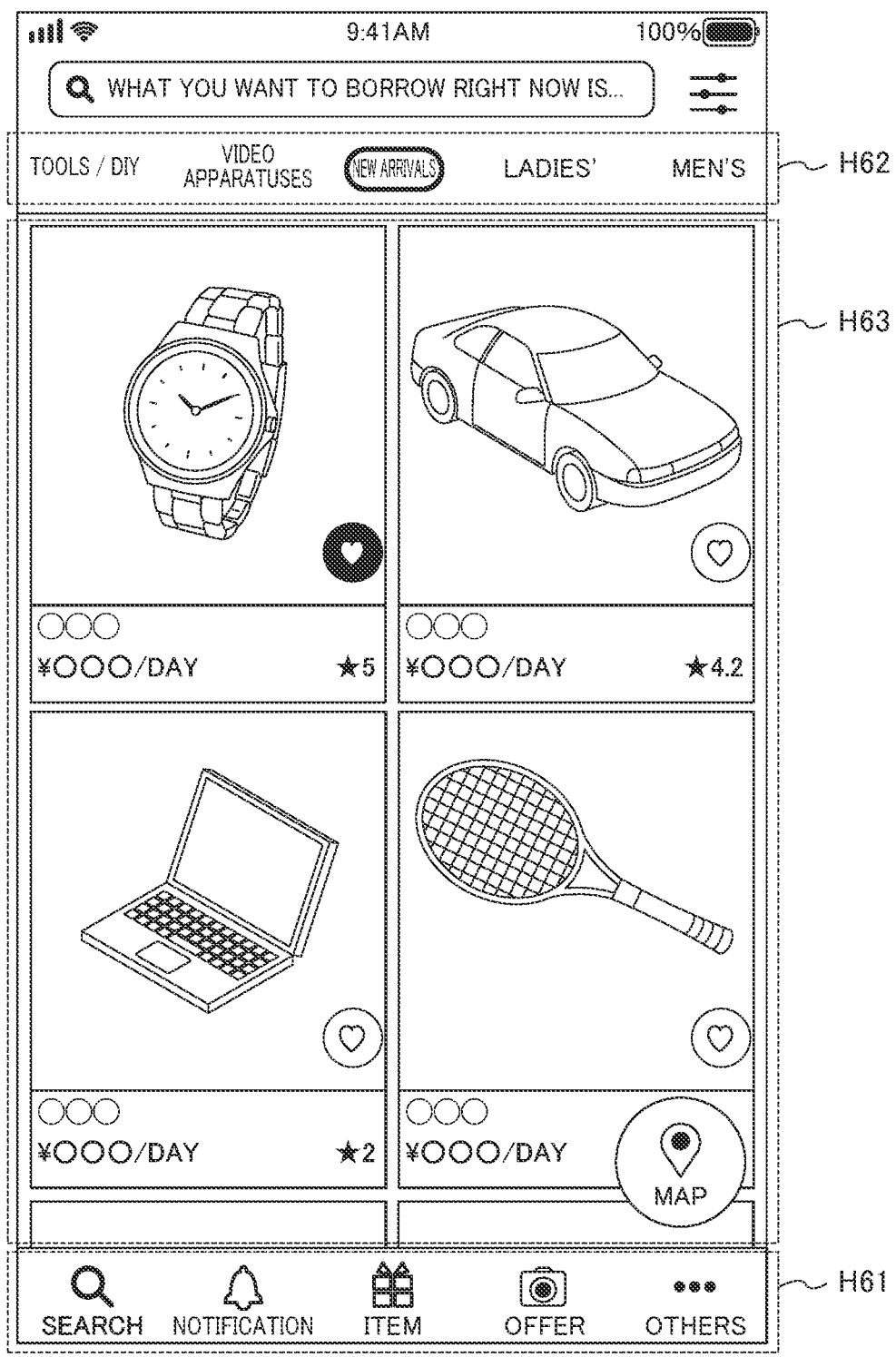
FIG. 13 is a view illustrating a specific example of an operational screen displayed on each of the borrower terminals, in a case in which a search operation of finding an offered item that the borrower user desires is performed.

FIG. 13 is a view illustrating a specific example of an operational screen displayed on each of the borrower terminals, in a case in which a search operation of finding an offered item that the borrower user desires is performed.

The screen illustrated in FIG. 13, among the screens to be displayed on each of the borrower terminals 3, is formed to include display regions H71 to H73.

In the display region H71, a plurality of operation buttons are displayed for the borrower user UB who desires to narrow down offered items to be displayed in a list on the borrower terminal 3 to find an offered item that the borrower user UB desires, from among the offered items. As described above, in the present service, a search function that is able to support both a "Rough" search and a "Fine" search is provided. Note that the operational screen used to narrow down offered items, as illustrated in FIG. 13, is an operational screen used to perform a "Fine" search.

Specifically, for example, although not illustrated, pressing a button B701 indicated as "Category" causes a screen on which it is possible to select a category and a subcategory to be displayed. Therefore, the borrower user UB is able to select a category and a subcategory to which an offered item that the borrower user UB desires is assumed to belong, making it possible to narrow down offered item3 to be displayed in a list on the borrower terminal 3.

Furthermore, for example, the borrower user UB is able to specify a period that the borrower user UB desires to borrow an offered item to narrow down offered items. That is, the borrower user UB is able t.o enter a desired period as a period for which the borrower user UB desires to rent an offered item, making it possible to narrow down offered items to be displayed in a list on the borrower terminal 3. Specifically, making entries in buttons B702a and B702b respectively used to enter a start date and an end date, which are displayed on a right-hand side to the indication "Rental period" displays, in a list, offered items that the borrower user UB is able to rent within the entered period.

Furthermore, for example, the borrower user UB is able to narrow down offered items on a rental-fee basis. That is, the borrower user UB is able to enter a desired price as a rental fee at which the borrower user UB desires to rent an offered item, making it possible to narrow down offered items to be displayed in a list on the borrower terminal 3. Specifically, making entries in buttons B703a and B703b respectively used to enter a minimum price and a maximum price for a rental fee, which are displayed on a right-hand side to the indication "Rental fee" displays, in a list, offered items that the borrower user UB is able to rent at a price falling within the price range.

Furthermore, for example, the borrower user UB is able to narrow down offered items with offer information including intentions to sell. That is, the borrower user UB is able to perform an entry operation to express an intention of desiring only offered items to be "outright purchased", making it possible to narrow down offered items to be displayed in a list on the borrower terminal 3. Specifically, pressing a switch button B704 displayed on a right-hand side to the indication "Outright purchase" makes it possible to sequentially switch and display, in a list, between offered items that are "able" to be "outright purchased" and offered item that are "not able" to be "outright purchased".

The borrower user UB is able to select types of prices of offered items to be displayed on the borrower terminal 3. Therefore, the borrower user UB is able to know at a glance rental fees corresponding to a period for which the borrower user UB desires to rent an offered item. Those displayed in the display region H72 as buttons used to set types of prices of offered items to be displayed on the borrower terminal 3 include a button B705a indicated as "Display daily (one day) rental fee", a button 705b indicated as "Display weekly (seven days) rental fee", and a button B705c indicated as "Display monthly (30 days) rental fee". The borrower user UB presses the button B705a to display daily rental fees, presses the button B705b to display weekly (seven days) rental fees, or presses the button B705c to display monthly rental fees. Note that, in the example in FIG. 13, only the button B705a is pressed. However, it is possible to further press at least either the button B705b or the button B705c. That is, the borrower user UB is also able to display all of, or to select and display one or two of daily rental fees, weekly (seven days) rental fees, and monthly rental fees.

In the display region H73, a button B706a indicated as "Clear" and a button B706b indicated as "Search" are displayed. To execute a search with the contents entered in the display regions H71 and H72, the borrower user UB presses the button B706b. Therefore, offered items that match the contents entered in the display regions H71 and H72 are displayed in a list. Furthermore, to cancel the contents entered in the display regions H71 and H72, the borrower user U3 presses the button B706a. Therefore, the contents entered in the display regions H71 and K72 are cleared.

Figure 14:
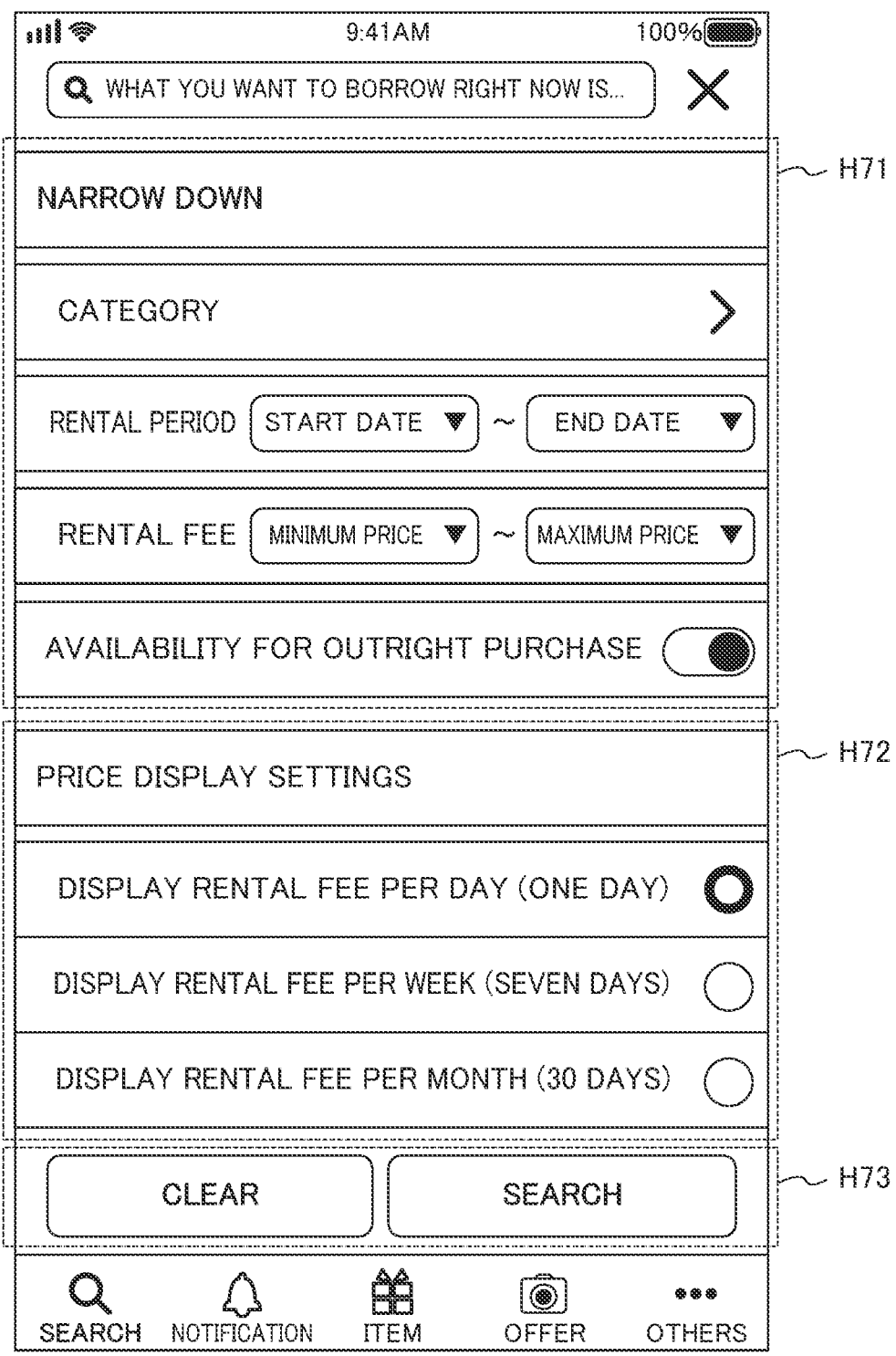
FIG. 14 is a view illustrating a specific example of an operational screen displayed on each of the borrower terminals, in a case in which an operation of checking a location at which an offered item that the borrower user desires is to be delivered is performed.

FIG. 14 is a view illustrating a specific example of an operational screen displayed on each of the borrower terminals 3, in a case in which an operation of checking a location at which an offered item that the borrower user desires is to be delivered is performed.

The screen illustrated in FIG. 14, among the screens to be displayed on each of the borrower terminals 3, is formed to include a display region H31 and a display region H82.

In the display region H81, offered items that match the search conditions are displayed in a list, as a result of the search operation by the borrower user UB. Those displayed in the example in FIG. 14, for each of offered items I1 to I3 that match the search conditions, include a thumbnail image, a name of the offered item (for example, "ooo"), and rental fees per rental periods (day, week, and month) (for example, "ooo yen/day"). Furthermore, a total count (for example, "150") of reviews by other users to the lender user UL who is the offeror is displayed per offered item.

In the display region H82, a map (MAP) is displayed, indicating locations to which the offered items I1 to I3 displayed in the list in the display region H81 are respectively to be delivered. Reasons of displaying, on the map (MAP), the locations to which the offered items are to be delivered, as described above, are as follows. Normally, items to be traded in electronic commerce (EC) sites and Internet auctions are delivered to buyers of the items through delivery means such as package delivery services. However, since buyers of items normally bear shipping fees of the items, a buyer of an item sometimes bears a shipping fee higher than a price of the item depending on a size or a weight of the item. On the other hand, most of the borrower users UB of the present service select to rent a desired item than to buy the desired item to utilize the desired item as cheap as possible. That is, a purpose of rental is to "save money by borrowing an item, instead of buying it". Therefore, there may be a case where, even though the present service is utilized to rent an offered item, a shipping fee is higher, relative to a price of the offered item. As a result, a price of a similar or equivalent item bought at a nearby actual shop may be cheaper than a total of the shipping fee and the price of the offered item. In this case, the purpose of rental to "save money by borrowing an item, instead of buying it" is ignored. In view of this issue, in the present service, efficient deliveries have been achieved by allowing, for example, the lender users UL who are the offerors to specify, as locations at which offered items are to be delivered, locations at which offered items are to be directly handed over and locations of unattended delivery lockers. Therefore, it is possible to prevent the purpose of rental, which is to "save money by borrowing an item, instead of buying it" from being ignored.

In the present service, the lender user UL who is the offeror is able to set a plurality of locations (for example, three locations of an X point, a Y point, and a Z point) as locations to one of which an offered item is to be delivered. Furthermore, it is also possible to change, per time period, locations to one of which an offered item is to be delivered. Specifically, for example, as locations to one of which an offered item is to be delivered, it is possible to finely set the locations to one of which an offered item is to be delivered and time periods, such as the X point for a time period from oo o'clock to oo o'clock, the Y point for a time period from oo o'clock to oo o'clock, and the Z point for a time period from oo o'clock to oo o'clock. Therefore, further efficient delivery is achieved.

Furthermore, in the present service, the lender user OL is also able to finely set conditions for delivering an offered item. Specifically, for example, it is also possible to increase or decrease a rental fee in accordance with a location at which an offered item is to be delivered and a date and a time. Therefore, for example, in a case in which the lender user UL makes a setting to deliver an offered item during nights or weekends in accordance with a request from the borrower user UB, the lender user UL is also able to set a higher rental fee than a rental fee in a case in which the offered item is to be delivered during the daytime on weekdays. Furthermore, for example, the lender user UL is also able to set a higher rental fee than a rental fee in a case in which a location at which an offered item is to be delivered is changed in accordance with a request from the borrower user UB. Therefore, the convenience of the lender users UL who are offerors is enhanced.

Each of marks P1 to P3 plotted in the map (MAP) displayed in the display region H82 is added with an identical number to the number added at the left top of a thumbnail image of each of the offered items I1 to I3 displayed in the list in the display region H81. Specifically, for example, the number "1" is added at the left top of the offered item I1 displayed in the display region H81, and the number "1" is added to the mark P1 plotted in the map (MAP; displayed in the display region H82. In this case, the position indicated by the mark P1 represents a location set by the lender user UL who is the offeror, at which the offered item I1 is to be delivered. Therefore, for example, even in a case in which the borrower user UB is unsure about which one of the offered items I1 to I3 to rent, the borrower user UB is able to select and rent one of the offered items, due to fact that the location at which the offered item is to be delivered is convenient for the borrower user UB themselves.

In the display region H82, a button B801 indicated as "MAP search settings" is displayed. The borrower user UB is able to press the button B801 to perform various settings regarding the map (MAP) displayed in the display region H82 (for example, to change scale, and to specify a region to be displayed).

As described above, the borrower user UB utilizing the present service pays a rental fee to the lender user UL to rent an offered item. At this time, the rental fee that the borrower user UB pays is a price that the lender user UL has set when the item is offered. That is, when the lender user UL offers an item, simply setting a rental fee per day automatically calculates a price when the item is rented for a plurality of days. Specifically, for example, when a rental fee per day is set to 500 yen, rental fees for one week (seven days), two weeks (14 days), one month (30 days), and two months (60 days) are automatically calculated. However, in the present service, when a rental fee for a plurality of days is calculated, it is not only that a rental fee per day is simply multiplied by rental days, but also optimization takes place based on predetermined logic. The "optimization" takes place based on logic as described below, for example. That is, the "optimization" takes place based on logic where a rental fee per day when an item is rented for a longer period becomes comparatively cheaper than a rental fee per day when the item is rented for one day, or logic where a rental fee is depreciated in accordance with a degree of degradation of an offered item. Furthermore, the optimization also takes place based on, as logic for the "optimization", logic where "season", "weekend", and "supply and demand", for example, are used as variables. Specifically, for example, for oil fan heaters that, are mainly and highly in demand during winter, the optimization takes place to increase a rental fee during winter compared to a rental fee during summer.

Furthermore, in the present service, when the borrower user UB presents a budget, a rental-possible period is automatically calculated. Therefore, the borrower user UB is not required to perform burdensome calculations, leading to enhanced convenience. Specifically, for example, when the borrower user UB who desires to rent a vehicle at a price of 50,000 yen simply presents the budget (50,000 yen) of the borrower user UB themselves, it is possible that a period (for example, one week) during which rental is possible within the budget (50,000 yen) is calculated.

Figure 15:
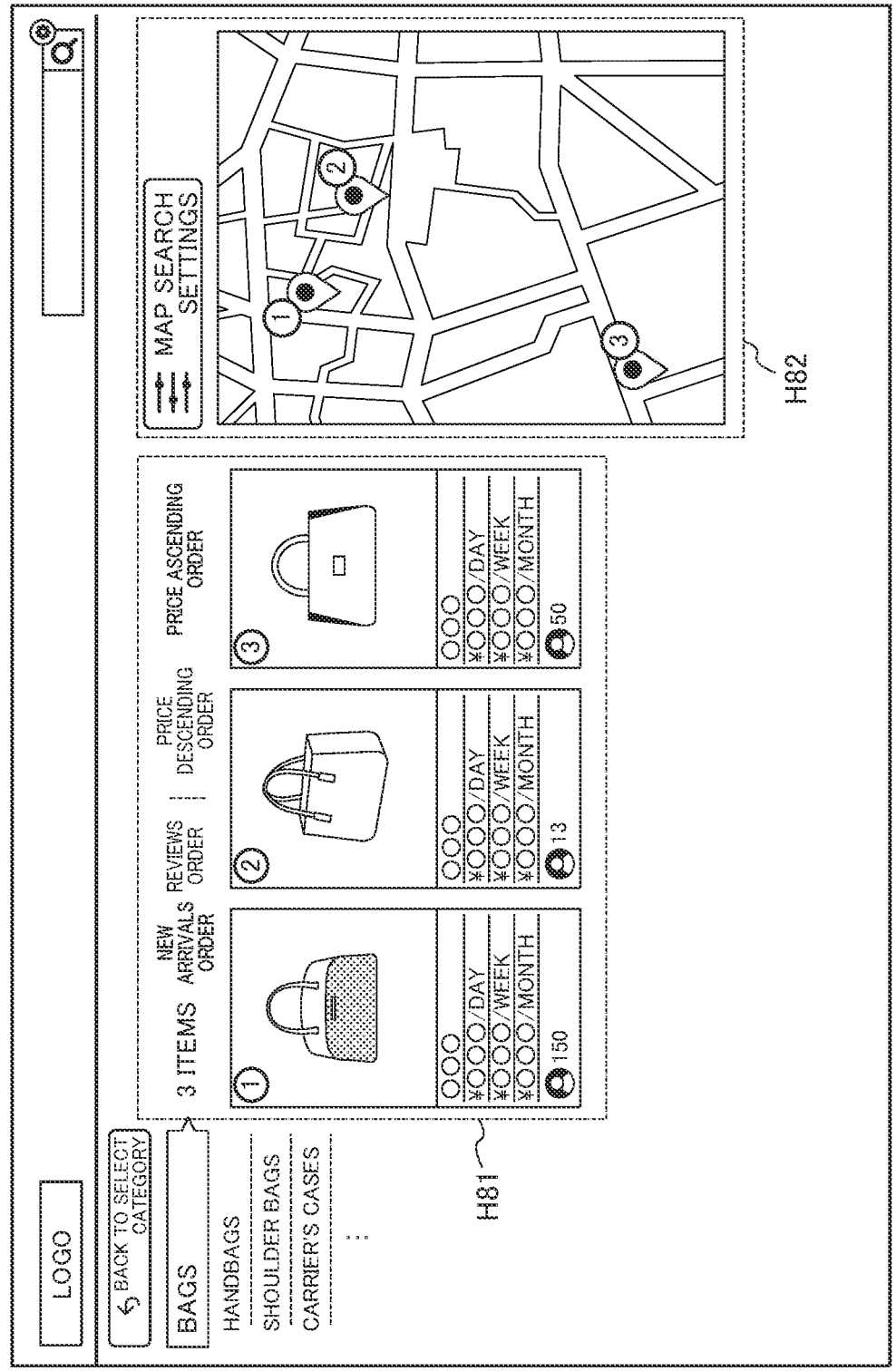
FIG. 15 is a view illustrating a specific example of an operational screen displayed on each of the lender terminals and the borrower terminals, in a case in which each of a lender user and the borrower user performs an operation of checking a record per offered item that was lent.

FIG. 15 is a view illustrating a specific example of an operational screen displayed on each of the lender terminals and the borrower terminals, in a case in which each of the lender users and the borrower users performs an operation of checking a record per offered item that was lent.

The screen illustrated in FIG. 15, among the screens to be displayed on each of the lender terminals 2 and the borrower terminals 3, is formed to include display regions H91 to H96.

In the display region H91, the part of the user information of the lender user UL who is the offeror is displayed as "Offeror information". Specifically, those displayed include, similar to the display region H21 in FIG. 8, the name (Offer Taro) of the lender user OL playing a role as the offeror, the total count (145) of reviews by other users, the breakdown of the reviews by other users, and the offer region (Hokkaido). Furthermore, in the display region H91, conditions for delivering the offered item are further displayed. Specifically, the conditions displayed include whether handover of the offered item is available, whether the offeror bears a shipping fee, whether the offeror bears an insurance fee, whether shipping within the same day is available, whether mail contact is available, and whether phone contact is available. Those displayed in the example in FIG. 15 include "Handover: o", "Shipping fee: x", "Insurance fee: o", "Shipping within the same day: x", "Mail contact: o", and "Phone contact: o". It is thus indicated that the lender user UL who is the offeror is able to handover the offered item, does not bear a shipping fee for the offered item, but bears an insurance fee for the offered item, is not able to send the offered item within the same day, and is able to accept mail and phone contacts.

In the display region H92, a part of offer information of the offered item is displayed as "Item information". Specifically, those displayed for the offered item include a rental fee per day, a rental fee per week, a rental fee per month, an outright purchase price, and the condition of the offered item.

In the display region H93, a button B901 indicated as "Rental log Click to ownership change" is displayed. The button B901 is a button corresponding to the button B231 in FIG. 8 and the button B32I in FIG. 9. When the button B901 is pressed, for example, a lending record per offered item (hereinafter referred to as a "rental log") is displayed in the display regions H95 and H96, and a fact that an ownership change is sounded out is notified to the current owner ("Offer Taro" in the example in FIG. 15).

In the display region H94, a rental schedule of the offered item is displayed in a calendar format. Therefore, for example, it is also possible to display in different colors a fixed rental period and a rental unavailable period. As a result, the lender user DL and the borrower user UB are able to know at a glance rental schedules of offered items.

In the display region H95, a graph indicating a transition of the rental fee is displayed. According to the graph displayed in the display region K95, the lender user UL and the borrower user UB are able to know at a glance the transition of the rental fee of the offered item. Furthermore, in a case in which a switch button B902 displayed in the display region H95 is turned to "ON", it is possible to display in a superimposed manner a transition of a rental fee of a similar offered item belonging to the identical category. Specifically, for example, in the example in FIG. 15, a curved line L11 plotted in the graph indicates the transition of the rental fee of the target offered item, and a curved line L12 indicates the transition of the rental fee of the similar offered item belonging to the identical category to the category to which the target offered item belongs. Therefore, with the graph displayed in the display region H95, the lender user UL and the borrower user UB are able to compare the target offered item with the similar offered item belonging to the identical category to the category to which the target offered item belongs, and to know at a glance the transition of the rental fee. In the example in FIG. 15, it is possible to know at a glance that a reduction rate of the rental fee of the target offered item is greater than a reduction rate of the rental fee of the similar offered item belonging to the identical category to the category to which the target offered item belongs. Therefore, for example, it is possible to determine that the target offered item has "less future prospects" to unselect the target offered item as an offered item to which an ownership change is applied.

In the display region H96, a record of rental periods, rental fees per day, reviewers (the borrower users UB who have had actually borrowed the offered item), and specific contents of the reviews by the reviewer are displayed in a list as a rental log of the offered item. According to the rental log displayed in a list in the display region H96, the lender user UL and the borrower user UB are able to know at a glance the contents of the reviews for the offered item and their transitions.

As described above, with the rental log displayed on each of the lender terminal 2 and the borrower terminal 3, the lender user UL and the borrower user UB are able to know at a glance that the record of the rental fees of the offered item and the reviews by the reviewers. Note herein that an act that the lender user UL lends an item (to be rented) to the borrower user UB to earn a utilization fee is regarded as an investment performed by an investor. That is, it is also possible to equate an act that the lender user UL buys an item for offer purposes and changes an ownership with an act that an investor buys an investment property. That is, an act of lending an item to earn a rental fee is a synonym to an act of stably earning a rate of return. Therefore, when such an act in which an individual or a corporate body buys an item for investment purposes, and lends the item to someone is actively performed, it is possible to provide markets based on a similar idea of a "profit return method" used in the real estate industry. In other words, it is possible to provide a market where a market price of an item is determined through a method different from conventional "pricing". Therefore, when the lender users UL and the borrower users UB who consider ownership change, for example, buy an item as an investment property, measuring the profitability of the item is beneficial. The rental log illustrated in FIG. 15 exactly represents such beneficial information for measuring the profitability of an item.

Furthermore, in the present service, it is possible to use a block chain technology to store rental logs and information indicating who possesses an ownership right of an offered item. The block chain technology is a distributed network technology with a function of preventing data from being falsified or destroyed, for example. According to the block chain technology, for example, a hash value that makes it difficult to predict a generated value is added to a data block per transmission unit. Adding such hash values in a chronological order makes falsification of the data further difficult.

As described above with reference to FIG. 15, rates of return of offered items and past reviews for the offered item are stored in a block chain as rental logs, for example. A rental log is information indicating a record of an offered item, and, due to the characteristics of rental, is important information that the lender users UL and the borrower users UB rely on for decision making. That is, a rental log is treated as an important asset of an offered item to be rented, and is taken over after the ownership has been changed.

As described above, in the present service, targets to be reviewed include not only offered items, but also users (the lender users OL and the borrower users UB). It is possible to edit a review for a user before a predetermined period expires. Specifically, for example, it is also possible that a review for a user is editable anytime before a certain period (for example, one week) passes after a rental period has expired.

Figure 16:
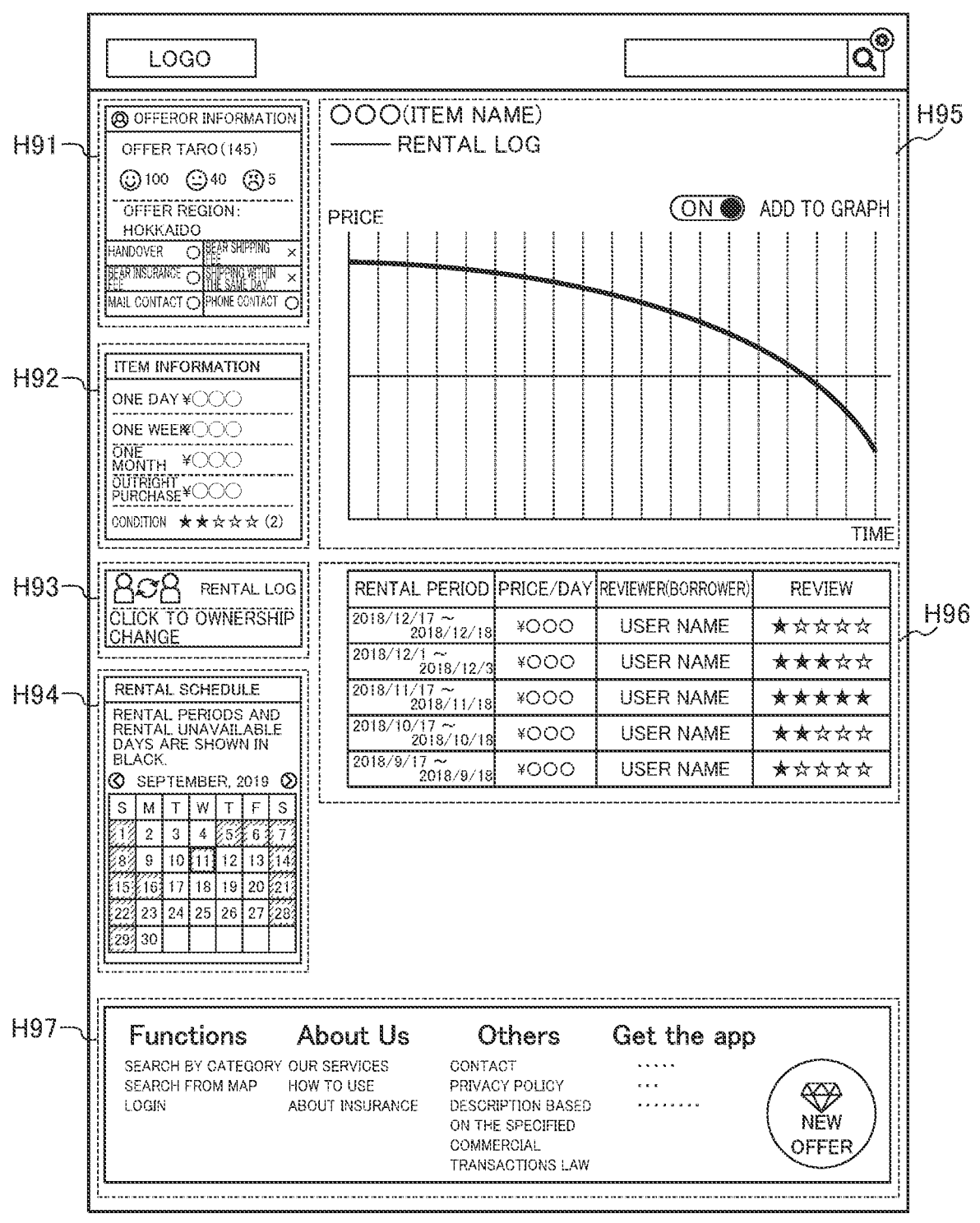

FIG. 16 is a conceptual view illustrating a flow of processing in a case in which the borrower user who has been renting an item makes an extension application for a rental period.

The present service is organized with GUIs and structures allowing the borrower user UB to feel free to make an extension application for a rental period. That is, in a case in which the borrower user UB utilizing the present service desires to extend a rental period, the borrower user UB makes an extension application as described below.

The borrower user UB makes an extension application within an originally-set contract period (before a date of return) (step SS31). Note herein that the extension application for the rental period is made upon the payment of an additional rental fee. Therefore, in the payment server 4, authorization is granted. The term authorization refers to processing of making available a credit card within its spending limit before a payment is made. When the authorization is completed, the extension application is officially accepted. The fact is then notified to the lender user UL.

The lender user UL having received the notification that the extension application has been officially accepted determines whether to approve or deny the extension application (step SS32). Note that, at this timing, the borrower user UB having made the extension application and the lender user UL are possible to negotiate about an extension period. Therefore, it is possible that the lender user UL not only simply determines whether to approve or deny the period offered through the extension application, but also presents an acceptable period. Therefore, for example, it is also possible to appropriately take into account a vacant period to a next rental period to present an acceptable period, leading to enhanced convenience. In a case in which the lender user UL approves the extension application, the payment processing for the additional rental fee is executed in the payment server 4. That is, in the present service, it is possible, at a timing when the extension application is approved, to immediately complete a payment. On the other hand, in a case in which the lender user UL denies the extension application, an authorization limit is canceled in the payment server 4. That is, the spending limit secured to execute the payment processing for the additional rental fee is canceled.

FIG. 17 is a view illustrating a specific example of an operational screen displayed on each of the borrower terminals, in a case in which the borrower user makes an extension application for a rental period.

The screen illustrated in FIG. 17, among the screens to be displayed on each of the borrower terminals 3, is formed to include display regions H101 to H105.

Those displayed in the display region H101 as a guidance to the borrower user UB who makes an extension application include text describing that, even in a case in which an extension application is made, no extension takes place as long as the lender user UL approves the extension application, text describing a deadline by which it is possible to make the extension application, and a date of return that is an expiration date of an originally-set contract period. Note that those displayed in the example in FIG. 17 include that the deadline by which it is possible to make the extension application is "At least four days before the date of return", and the date of return that is the expiration date of the originally-set contract period is "Date of return of this item: Jan. 30, 2019".

In the display region H102, a button B111 is displayed, which is used to select and enter a desired date by the borrower user UB as an end date of the extended rental period (hereinafter referred to as a "desired extension date"). Note that, in the example in FIG. 17, the desired extension date is displayed as "2019/06/21".

In the display region H103, a simulation result of an additional rental fee, in a case in which the extension application with the desired extension date (Jun. 21, 2019) entered with the button B111 in the display region H102 is approved, is displayed. Mote that those displayed in the example in FIG. 17 include "Desired extension date: Jun. 21, 2019", "Rental for 20 days", "3 months @100,000 yen 1,300,000 yen", "+2 weeks @50,000 yen 200,000 yen", "+29 days @1,500 yen 50.000 yen", "Consumption tax 8% 1,000 yen", and "Total 300.000 yen".

In the display region H104, a content of a payment method for the additional rental fee is displayed. It is possible to change the payment method by pressing a button B112 indicated as "Change".

In the display region H105, a button B113 indicated as "Extension application & payment" is displayed. The borrower user UB is able to press the button B113 to make an extension application including the payment of the additional rental fee.

FIG. 13 is a view illustrating a specific example of an operational screen displayed on each of the lender terminals, in a case in which the lender user who has been lending the item performs an operation of responding to the extension application for the rental period.

The screen illustrated in FIG. 18, among the screens to be displayed on each of the lender terminals 2, is formed to include display regions H111 to H113.

In the display region Hill, description for the lender user UL who negotiates with the borrower user UB who has made the extension application is displayed. Furthermore, in the description, a button B211 indicated as "Message" is displayed. The lender user UL is able to press the button B211 to create a message for the negotiation with the borrower user UB. Since the created message is presented to the borrower user UB, the lender user UL is able to efficiently negotiate with the borrower user UB about the extension application.

Furthermore, in the display region Kill, the identical content to the content of the simulation result of the additional rental fee displayed in the display region H103 in FIG. 17 is displayed. The lender user UL confirms the content displayed in the display region Hill to determine to approve or deny the extension application.

In the display region H111, a button B212 is displayed, which is used to select and enter a content, of processing on the extension application. To approve the extension application, the lender user UL selects an option indicated as "Extendable", as illustrated in FIG. 18, for example. On the other hand, to deny the extension application, the lender user UL selects another option indicated as "Not extendable", for example. Furthermore, in a case in which an adjustment for the extension period has been made with the borrower user UB, the lender user UL selects still another option indicated as "Extendable, but desired extension date needs to be changed.", for example.

Furthermore, according to the present service, it is possible to achieve functions as described below.

That is, it is possible to utilize the present service as a risk hedge against inflation (a reduction in monetary value). Therefore, it is possible to pool sales amounts. During inflation, an amount of money that a thing (an item or a service) earns relatively increases. That is, there may be a situation where a thing (an item or a service) that is able to be bought at a price of 10,000 yen today will not be able to be bought at the price of 10,000 yen tomorrow. Therefore, an amount of money (i.e., a sales amount) that a thing (an item or a service) has earned during an inflation period is used to newly rent an item or to change an ownership to convert currency that would be likely to lower in value into an item that would be less likely to lower in value, and to possess the item. Specifically, a sales amount or points exchanged from the sales amount are used to newly borrow an item or to change an ownership. Furthermore, it is possible to deposit the points.

Furthermore, in the present service, if an item is damaged or stolen, it is possible to fill predetermined fields in an insurance application form (not illustrated) to directly make a compensation application to an insurance company. Therefore, the lender user UL is able to lend an item without feeling anxious. Furthermore, the borrower user UB is able to rent and use the item without feeling anxious.

Furthermore, in the present service, in addition to a role of the lender user UL, the present service provider M is able to play a role of a representative of a service operator to also offered items. Furthermore, in the present service, in addition to a role of the borrower user UB, the present service provider M is able to play the role of the representative of the service operator to also rent offered items. Furthermore, the present service provider M is able to play the role of the representative of the service operator to also offer (sublease) rented items. Furthermore, the present service provider M is able to play the role of the representative of the service operator to also buy a plurality of items or to rent a plurality of offered items, and to lend (or sublease) a combination thereof as a unit package.

Furthermore, in the present service, it is possible to flexibly change a method of delivering an item after a rental period has expired. That is, in ordinary rental services, an item is normally returned from a borrower to a lender after a rental period has expired. However, a delivery period in this case leads to a time loss, sacrificing an opportunity to earn money for the lender users UL. In view of this issue, in the present service, for example, addresses of borrowers whose rental periods are overlapping with each other are referred to, making it possible to change a destination to which an item is returned from the corresponding one of the lender users UL to a next one of the borrower users UB. Specifically, such settings of selecting destinations of delivery take place. Therefore, it is possible to efficiently deliver items. Furthermore, it is also possible to utilize anonymous delivery services, making it possible that previous ones of the borrower users UB are not aware about where the returned items are delivered. Furthermore, in a case in which an offered item, such as a garment, needs to be cleaned before next one of the borrower users UB uses the offered item, it is also possible to specify a predetermined cleaner as a destination of delivering the item after a rental period for a previous one of the borrower users UB has expired. Furthermore, in a case in which an item does not need to be cleaned, it is also possible to specify a predetermined storage as a destination of delivering the item.

Furthermore, according to the present service, sale and leaseback trading is possible. The term "sale and leaseback trading" refers to trading where an asset, which is once sold, is borrowed. That is, the sale and leaseback trading refers to trading where, for an item that a person desires to continuously utilize the item, (1) an ownership right is only changed from the person to the lender user UL, and (2) the person plays a role as the borrower user U8 to rent the item from the lender user UL. Therefore, even though the borrower user UB (i.e., the "person") devolves the ownership right of the item that the borrower user UB is keep using to the lender user UL, the borrower user UB is able to continuously utilize the item. As a result, for example, it is possible to avoid a risk of an opportunity loss due to a seasonal factor when the item is to be sold. Specifically, for example, since there are normally and particularly concentrated demands of school uniforms in early March, it is desirable that the school uniforms be sold in early March to sell them at higher prices. However, a seller of a school uniform obviously desires to possess the school uniform by late March to wear it for the graduation ceremony. To respond to this demand, the seller of the school uniform is also able to utilize the present service to perform the sale and leaseback trading to sell the school uniform in early March, but to rent and use the school uniform by a date after the graduation ceremony by paying a rental fee, for example. In this case, after the graduation ceremony, the lender user who has bought the school uniform is also able to rent (sublease) the school uniform to another user.

Furthermore, in the present service, a unique credit method that has not been present conventionally is adopted. Since the item rental field is based on the premise of a trust relationship between persons' credit is a very important factor to provide the present service. Therefore, a security is ensured by performing credit examinations at various angles. Specifically, for example, disclosing a rental log to a third party to allow the third party to use the rental log for the credit examinations makes it possible to establish further precise credit. Therefore, for example, it is also possible to determine that a person paying a monthly rental fee of 100,000 yen without particular delay is credible. Furthermore, for example, it is possible to link various digital accounts to a user as security. Specifically, it is also possible to adopt, as such security, IDs and passwords for accounts of various SNSs and games.

FIG. 19 is a view illustrating a specific example of a method of capturing an image of an offered item.

As described above, when the borrower user UB is about to return an offered item, the borrower user UB operates the borrower terminal 3 to capture an image of the offered item. The purpose of capturing an image at this time is to make available images of an offered item to be compared with each other, which are captured at two timings of the start of rental and the end of the rental (when returned), to check if there are scratches left during the rental period, for example. Therefore, to capture images at two timings, the images need to be each captured at an identical angle with an identical size to make a comparison possible. However, those ordinary persons who capture such images normally face difficulties in capturing such images that make a comparison possible. In view of this issue, an imaging tool illustrated in FIG. 19 is used to capture images. Therefore, even ordinary persons are able to capture such images that make a comparison possible. Specifically, as illustrated in FIG. 19, a captured image GA71 included in offer information when an item is offered and a camera (the borrower terminal 3) are allowed to layer with each other. With this state (in the state where the captured image GA71 is kept displayed), a lens of the camera (the borrower terminal 3) is faced toward an actual item GB71 of the offered item whose rental period has expired. As illustrated in FIG. 12, the camera (the borrower terminal 3) is then caused to display the captured image GA71 and the actual item GB71 in a state where they are overlapping with each other. Note herein that, when an orientation and a distance of the camera (the borrower terminal 3) are adjusted to allow the captured image GA71 and the actual item GB71 to be at an identical position (to be in a state where they are completely overlapping with each other), an imaging button B71 becomes active at a timing when the identical position is attained, allowing the user to capture an image. Therefore, even ordinary persons are able to capture such images that make a comparison possible.

Furthermore, since, in the present service, a three-dimensional (3D) image is generated from the captured image of the offered item, it is possible to freely view the 3D image in a desired one of upper, lower, left, and right directions. Therefore, it is possible to compare with each other images captured before and after an offered item is rented and to judge whether the offered item is genuine or not.

Although the embodiment of the present invention has been described, the present invention is not limited to the embodiment described above. The present invention still includes amendments and modifications, for example, that fall within the scope of the present invention, as long as it is possible to achieve the object of the present invention.

Although, for example, in the configuration of the embodiment described above, the borrower user UB is able to make a borrow application for an offered item to borrow the item without problems, the present invention is not limited to such configurations as described above. For example, such a configuration may be applicable where there are a plurality of borrow applicants. In this case, an auction style may be adopted to allow a bidder who has won the bid to borrow an offered item. In a case in which such an auction style is adopted, other competing factors than price may be adopted to assign a bidder who has won the bid. For other competing factors than price, it is possible to adopt, for example, reviews by other users and earned points. Therefore, it is possible to expect an increase in the number of users who desire to utilize the present service with sincere attitudes, making it possible to prevent acts of dishonesty and troubles that may tend to easily occur in C to C trading.

Furthermore, for example, the embodiment described above has exemplified tangible items as items to be rented. However, the present invention is not limited to such tangible items. For example, intangible human stills and rights may be rented. Furthermore, those that are intangible may be substituted by tangible items in the form of certificates, for example. For example, a membership of a golf club is treated as a tangible item that substitutes an intangible "right to play golf".

Furthermore, for example, the embodiment described above has introduced the example where a single offered item (for example, a jacket, a handbag, a clock, or a watch) is traded. However, the present invention is not limited to such a case where a single offered item (i.e., an item to be rented) is traded. For example, for comics consisting of a total of ten volumes, a user who has comics other than ninth volume may also offer "the first to eighth volumes and the tenth volume of the comic". In this case, if there is a user who only has the ninth volume, the user may make a borrow application or a purchase application for "the first to eighth volumes and the tenth volume of the comic". Furthermore, the user who only has the ninth volume may also borrow or buy "the first to eighth volumes and the tenth volume of the comic" to complete the total of ten volumes of the comic, and may lend (so-called sublease) the full set of the comic to another user for a predetermined period.

Furthermore, for example, the configurations of the GUIs to be each displayed on each of the lender terminals 2 or the borrower terminals 3, as illustrated in FIGS. 6 to 15 and FIGS. 17 to 19, are mere examples. It is possible to adopt other configurations than the configurations of the GUIs as illustrated in FIGS. 6 to 15 and FIGS. 17 to 19, as long as the GUIs make it possible to achieve the present service.

Furthermore, the hardware configuration illustrated in FIG. 3 is a mere example used to achieve the object of the present invention. The present invention is not particularly limited to the hardware configuration illustrated in FIG. 3.

Furthermore, the functional block diagram illustrated in FIG. 4 is a mere example. The present invention is not particularly limited to the functional block diagram illustrated in FIG. 4. That is, it is enough that an information processing system has functions that make it possible to execute the series of processing described above. Functional blocks used to achieve the functions are not particularly limited to the functional blocks illustrated in the example in FIG. 4.

Furthermore, locations at which the functional blocks are present are not limited to the locations in FIG. 4. Desired locations may be selected. Furthermore, a single piece of hardware may configure one functional block. A single piece of software may configure one functional block. A combination of pieces of hardware and software may configure one functional block.

To execute, with software, processing of each functional block, a program configuring the software is installed into a computer from a network or a recording medium, for example. The computer may be such a computer incorporated in special hardware. Furthermore, the computer may be such a computer installed with various programs used to execute various functions, such as, in addition to servers, general-purpose smart phones and personal computers.

A recording medium storing such programs as described above may not only be a removable medium distributed separately from a device main body to provide the programs to each user, but also be a recording medium provided to each user in a state where the recording medium is assembled beforehand in the device main body, for example.

Note that, in the present specification, steps describing programs recorded in a recording medium includes not only processes sequentially executed in a chronological order, but also processes that may not necessarily be executed in a chronological order, but may be executed in parallel or separately.

Furthermore, in the present specification, the term system means a generic apparatus including a plurality of devices and a plurality of means, for example.

To summarize those described above, it is enough that the information processing device to which the present invention is applied takes a configuration as described below. The information processing device may still take one of various embodiments. That is, the information processing device (for example, the management server 1) to which the present invention is applied is an information processing device that supports one or more first users (for example, the lender users UL1 to ULn in FIG. 1) who desire to lend items (for example, offered items) and one or more second users (for example, the borrower users UB1 to UBm in FIG. 1) who desire to borrow the items. The information processing device includes:

offer acquisition section (for example, the offer acquisition unit 101 in FIG. 5) of acquiring, as offer information, information regarding the items, the information being provided from each of the one or more first users;

offer presentation section (for example, the offer presentation unit 102 in FIG. 5) of presenting, to the one or more second users, one or more pieces of the offer information acquired by the offer acquisition section;

borrow receiving section (for example, the borrow receiving unit 103 in FIG. 5) of receiving, in a case in which there is an application from one of the one or more second users of wanting to borrow one of the items, the application as a borrow application; and borrow presentation section (for example, the borrow presentation unit 104 in FIG. 5) of presenting, to a corresponding one of the one or more first users, that there is the borrow application. Therefore, it is possible to provide a C t.o C rental platform through which one or more individuals who desire to lend items are able to be efficiently matched with one or more individuals who desire to borrow the items.

Furthermore, it is possible to further include:

cost presentation section (for example, the cost presentation unit 105 in FIG. 5) of presenting a cost (for example, a rental fee and an insurance fee) required to borrow the one of the items to the one of the one or more second users, the one of the one or more second users having made the borrow application;

payment acquisition section (for example, the payment acquisition unit 106 in FIG. 5) of acquiring, in a case in which a payment of the cost has been completed, information indicating that the payment has been completed;

sales management section (for example, the sales management unit 107 in FIG. 5) of recording and managing, as a sales amount, a predetermined amount of money in the cost;

payment presentation section (for example, the payment presentation unit 108 in FIG. 5) of presenting, to the corresponding one of the one or more first users, that the payment has been completed;

withdrawal receiving section (for example, the withdrawal receiving unit 109 in FIG. 5) of receiving, in a case in which there is an application of wanting to withdraw at least a part of the sales amount from the corresponding one of the one or more first users, the application as a withdrawal application; and withdrawal determination section (for example, the withdrawal determination unit 110 in FIG. 5) of determining, based on a content of the withdrawal application, an amount of money at which the corresponding one of the one or more first users is allowed to withdraw from the sales amount. Therefore, it is possible to execute the sales management processing described above. That is, it is possible to efficiently manage a flow of money along with trading through the present service.

Furthermore, the one or more first users are each allowed to make a request to sell each of the items, in addition to making a request to lend each of the items, the one or more second users are each allowed to make a request to purchase each of the items, in addition to making a request to borrow each of the items, and the offer information provided from each of the one or more first users includes information regarding whether the items are each sellable, and it is possible to further include: purchase receiving section (for example, the purchase receiving unit 111 in FIG. 5) of receiving, in a case in which there is an application from a predetermined one of the one or more second users of wanting to buy one of the items, the application as a purchase application; and purchase presentation section (for example, the purchase presentation unit 112 in FIG. 5; of presenting to a corresponding one of the one or more first users that there is the purchase application, the corresponding one of the one or more first users having provided the offer information including information indicating that the one of the items is sellable, as the information regarding whether the one of the items is sellable. Therefore, it is possible to execute the ownership change processing described above.

Furthermore, one piece of the offer information may include a captured image of one of the items, and it is possible to further include: return receiving section (for example, the return receiving unit 113 in FIG. 5) of receiving, in a case in which a borrow period (for example, a rental period) of the one of the items expires, return information at least including a captured image of the one of the items, the captured image being captured at expiration of the borrow period; and comparison and extraction section (for example, the comparison and extraction unit 114 in FIG. 5) of comparing with each other the captured image included in the one piece of the offer information and the captured image included in the return information, and extracting a difference. Therefore, it is possible to execute the image diagnosis processing described above.

Furthermore, it is possible to further include: borrow approval receiving section (for example, the borrow approval receiving unit 115 in FIG. 5) of receiving approval of the one of the one or more second users having borrowed the one of the items, in a case in which the one of the one or more second users has approved a difference in condition between an actual item of the one of the items when the one of the one or more second users has received the one of the items and the one of the items being displayed in the captured image included in the one piece of the offer information, and return approval receiving section (for example, the return approval receiving unit 116 in FIG. 5) of receiving approval of the corresponding one of the one or more first users having lent the one of the items, in a case in which the corresponding one of the one or more first users has approved a difference in condition between an actual item of the one of the items when the one of the items is returned to the corresponding one of the one or more first users and the one of the items being displayed in the captured image included in the return information. Therefore, it is possible to enhance the effectiveness of the image diagnosis processing described above.

Furthermore, it is possible to further include: association acquisition section (for example, the association acquisition unit 117 in FIG. 5) of acquiring trading results of other items associated with the one of the items; and reference amount of money presentation section (for example, the reference amount of money presentation unit 118 in FIG. 5) of presenting a price range for the cost of the one of the items, based on the trading results of the other items, the trading results being acquired. Therefore, it is possible to execute the appropriate price determination processing described above.

Furthermore, it is possible t.o further include review receiving section of receiving a review, from the one of the one or more second users, the one of the one or more second users having borrowed the one of the items, regarding at least either the corresponding one of the one or more first users, the corresponding one of the one or more first users having lent the one of the items, or the one of the items itself, or of receiving a review, from the corresponding one of the one or more first users, the corresponding one of the one or more first users having lent the one of the items, regarding at least either the one of the one or more second users, the one of the one or more second users having borrowed the one of the items, or the one of the items itself. It is possible that the reference amount of money presentation section further presents a record of the cost of the one of the items (for example, a rental log indicated by the curved line L1 in FIG. 15) and a record of the review received by the review receiving section and a record of costs of the other items associated with the one of the items (for example, the transition of the rental fee of similar offered item, indicated by the curved line L2 in FIG. 15) and a record of reviews received by the review receiving section.

Therefore, it is possible to compare a record of costs required to borrow an item and reviews with a record of costs required to borrow a similar item to other items associated with the item and reviews.

Furthermore, it is possible that the offer presentation section presents, to the one or more second users, as the one or more pieces of the offer information, information at least including information (for example, the map (MAP) in FIG. 14) regarding a location at which the one of the items is to be delivered.

Therefore, it is possible to specify, as a location at which an item is to be delivered, a location at which the item is to be directly handed over or a location of an unattended delivery locker, achieving efficient delivery. As a result, it is possible to prevent the purpose of rental to "save money by borrowing an item, instead of buying it"from being ignored.

Furthermore, it is possible that the items to be lent from the one or more first users to the one or more second users include items devolved from the one or more second users to the one or more first users, the items being used and will be used continuously by the one or more second users. Therefore, it is possible to achieve the sale and leaseback trading.

EXPLANATION OF REFERENCE NUMERALS

1: Management server; 2, 2-1, 2-$n$: Lender terminal; 3, 3-1, 3-$m$: Borrower terminal; 4; Payment server; 11: CPU; 12: ROM; 13: RAM; 14: Bus; 15: Input-and-output interface; 16: Output unit; 17: Input unit; 18: Storage unit; 19: Communication unit; 20: Drive; 30: Removable medium;

101: Offer acquisition unit; 102: Offer presentation unit; 103: Borrow receiving unit; 104: Borrow presentation unit; 105: Cost presentation unit; 106: Payment acquisition unit; 107: Sales management unit; 108: Payment presentation unit; 109: Withdrawal receiving unit; 110: Withdrawal determination unit; 111: Purchase receiving unit, 112: Purchase presentation unit; 113: Return receiving unit; 114: Comparison and extraction unit; 115: Borrow approval receiving unit; 116: Return approval receiving unit; 117: Association acquisition unit; 118: Reference amount of money presentation unit; 401: User DB; 402: Offer DB; H1 to H5, H11 to H15, H21 to H26, H31 to H36, H41 to H47, H51 to H54, H61 to H64, H71 to H73, H81, H82, H91 to H96, H101 to H105, H111 to H113, H531 to H533, H541: Display region; B11, B12, B21, B71, B111 to B113, B151, B211 to B213, B231, B241, B321, B331, B411, B601, B602, B701 to B706b, B801, B901, B902: Button; M41, M51: Mark; GA71: Captured image when item is offered; GB71: Actual item of offered item whose rental period has expired; L1, L2: Straight line; SS1 to SS6: Steps in present service; SS21 to SS25: Steps in payment service; SS31 and SS32: Steps for extension application; P: Payment service provider; M: Present service provider; N: Network; UL, UL1, OLn: Lender user; UB, UB1, UBn: Borrower user; R161: Entry field; I1 to I3: Offered item; P1 to P3: Mark, L11, L12: Curved line

The invention claimed is:

1. An information processing device that supports a first user who desires to lend an offered item and a second user who desires to borrow the offered item, the information processing device comprising:
a management server comprising a computer processor and a memory, wherein the management service is coupled to a lender terminal and a borrower terminal comprising a camera device,
wherein the computer processor in the management server is configured to manage item lending by performing the steps of:
acquiring, as offer information, information regarding the items, the information being provided from the first user
presenting, to the second user, the offer information;
receiving, from the second user using the borrower terminal, a request to borrow the offered item in a borrow application;
presenting, to the first user using the lender terminal, that there is the borrow application;
presenting a cost required to borrow the offered item to the second user, the second user having made the borrow application using the borrower terminal;
acquiring, in a case in which a payment of the cost has been completed, information indicating that the payment has been completed;
recording and managing, as a sales amount, a predetermined amount of money in the cost;
presenting, to the corresponding the first user, that the payment has been completed;
acquiring, from the lender terminal, a first plurality of captured images for the offered item;
acquiring, from the borrower terminal, a second plurality of captured images at a start of a rental period for the offered item from the camera device, wherein at least one of the first plurality of captured images and at least one of the second plurality of captured images are acquired at an identical angle and an identical size using an imaging button in a graphical user interface in the borrower terminal;
extracting a difference between the first plurality of captured images and the second plurality of captured images to determine a physical condition of the offered item;
receiving, from the first user using the borrower terminal, a request to withdraw at least a part of the sales amount based on the physical condition of the offered item in a withdrawal application; and
determining, based on a content of the withdrawal application, an amount of money the first user is allowed using the lender terminal to withdraw from the sales amount.

2. The information processing device according to claim 1,
wherein the first user is allowed to make a request to sell the offered item, in addition to making a request to lend the offered item,
wherein the second user is allowed to make a request to purchase the offered item, in addition to making a request to borrow the offered item, and
wherein the offer information provided from the first user includes information regarding whether the offered item is sellable,
the computer processor in the management server is further configured for performing the steps of:
receiving, in a case in which there is an application from the second user of wanting to buy the offered item, the application as a purchase application; and
presenting to the first user that there is the purchase application, the the first user having provided the offer information including information indicating that the offered item is sellable, as the information regarding whether the offered item is sellable.

3. The information processing device according to claim 1,
wherein the offer information includes a captured image of the offered item,
the computer processor in the management server is further configured for performing the steps of:
receiving, in a case in which a borrow period of the offered item expires, return information at least including a captured image of the offered item, the captured image being captured at expiration of the borrow period; and
comparing with each other the captured image included in the one piece of the offer information and the captured image included in the return information, and extracting a difference.

4. The information processing device according to claim 3, wherein the computer processor in the management server is configured for performing the steps of
receiving approval of the second user having borrowed the offered item, in a case in which the second user has approved a difference in condition between an actual item of the offered item when the second user has received the offered item and the offered item being displayed in the captured image included in the offer information; and
receiving approval of the first user having lent the offered item, in a case in which the first user has approved a difference in condition between an actual item of offered item when the offered item is returned to the first user and the offered item being displayed in the captured image included in the return information.

5. The information processing device according to claim 1, wherein the computer processor in the management server is further configured for performing the steps of:

acquiring trading results of other items associated with the offered item; and presenting a price range for the cost of the offered item, based on the trading results of other items, the trading results being acquired.

6. The information processing device according to claim 5, wherein the computer processor in the management server is further configured for performing the steps of:

receiving a review, from the second user, the second user having borrowed the offered item, regarding at least either the first user, the first user having lent the offered item, or of receiving a review, from the first user, the first user having lent the offered item, regarding at least the second user, or the offered item itself, wherein a record is presented of the cost of the offered item and a record of the review and a record of costs of other items associated with the offered item and a record of reviews.

7. The information processing device according to claim 1, wherein, to the second user, as the offer information, information is presented at least including information regarding a location at which the offered item is to be delivered.

8. The information processing device according to claim 1, wherein the offered item lent from the first user to the second user include an item devolved from the second user to the first user, the item being used and will be used continuously by one or more users.

* * * * *